(12) United States Patent
Rampata et al.

(10) Patent No.: US 10,311,510 B2
(45) Date of Patent: Jun. 4, 2019

(54) SYSTEM AND METHOD FOR PROVIDING SEQUENTIAL MEDIA ITEMS

(71) Applicant: Apple Inc., Cupertino, CA (US)

(72) Inventors: Brett A. Rampata, San Francisco, CA (US); Martin J. Murrett, Portland, OR (US); Charles J. Migos, Millbrae, CA (US); Casey M. Dougherty, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 727 days.

(21) Appl. No.: 14/503,250

(22) Filed: Sep. 30, 2014

(65) Prior Publication Data
US 2016/0071198 A1    Mar. 10, 2016

Related U.S. Application Data

(60) Provisional application No. 62/046,790, filed on Sep. 5, 2014.

(51) Int. Cl.
G06Q 30/06    (2012.01)
G06Q 30/02    (2012.01)

(52) U.S. Cl.
CPC ......... G06Q 30/0643 (2013.01); G06Q 30/02 (2013.01); G06Q 30/06 (2013.01)

(58) Field of Classification Search
CPC .............. G06Q 30/0643; G06Q 30/00–30/08
USPC ...................................................... 705/27.2
See application file for complete search history.

(56) References Cited

U.S. PATENT DOCUMENTS

| 8,037,011 B2 * | 10/2011 | Gadanho ................ G06Q 30/02 706/45 |
| 8,683,015 B2 | 3/2014 | Jeong |
| 2012/0204086 A1 | 8/2012 | Stoner et al. |
| 2014/0067598 A1 * | 3/2014 | Iida .................... G06Q 30/0631 705/26.7 |
| 2014/0081776 A1 * | 3/2014 | King ................... G06Q 20/405 705/14.73 |
| 2014/0123311 A1 | 5/2014 | Pegg et al. |
| 2014/0372429 A1 * | 12/2014 | Ziklik ............... G06F 17/30867 707/736 |
| 2015/0006258 A1 * | 1/2015 | Salama ............. G06Q 30/0206 705/7.35 |

OTHER PUBLICATIONS

"Designing a Multi-Slate Reading Environment to Support Active Reading Activities." Nicholas Chen, Francois Guimbretiere, and Abigail Sellen. ACM Transactions on Computer-Human Interaction (TOCHI), vol. 19, No. 3, Oct. 2012, pp. 1-35. (Year: 2012).*
Larson, Lotta C., "Digital Readers: The Next Chapter in E-Book Reading and Response," Sep. 2010, pp. 15-22, vol. 64, No. 1, International Reading Association.

* cited by examiner

*Primary Examiner* — Michael Misiaszek
*Assistant Examiner* — Jason B Warren
(74) *Attorney, Agent, or Firm* — Fletcher Yoder PC

(57) ABSTRACT

A system and method of providing sequential media content. The system of some embodiments provides a library that displays representations of media items stored on a device. The library displays representations of a series object. Activating the series object displays purchased media items in a series of media items. After a threshold amount of a media item in the series has been consumed, the series object displays a representation of a next media item in the series along with a control for purchasing the next media item in the series.

26 Claims, 13 Drawing Sheets

SYSTEM AND METHOD FOR PROVIDING SEQUENTIAL MEDIA ITEMS

BACKGROUND

Media viewing applications (e.g., an electronic book ("e-book") reader, a media player for video and/or audio files, etc.) on a device sometimes provide a library mode which displays a plurality of representations (e.g., thumbnail images) of media items (e.g., e-books, videos, audio files, etc.) that the user of the application (user) has available to consume (e.g., read, watch, listen to, etc.). In some cases, the library also displays representations of additional media items. The library may display purchased items available in a cloud network. That is, media items that are not present on the device on which the media viewing application is running, but which have previously been purchased and are available for download from a network cloud. Network clouds may include a user's on-line storage location or an on-line storage location of an on-line store from which the content was previously purchased.

Many types of media content are created in a serial form. Books are often written which are sequels to other books, parts of trilogies, or parts of longer series of books. Similarly, movies, television (TV) shows, web based video series, and other video media presentations are often part of a series of two or more video presentations.

Currently, ways to purchase additional media items in a series exist, but each requires multiple inconvenient steps. For example, to purchase additional books in a series, a user must decide that additional content relating to the book is worth seeking out. The user must then independently identify other books in the series and determine which of those books is the next book in the series. The user must then enter the title of that book into a search engine of an on-line store, find the book and finally purchase it. Another method involves going to an on-line store, searching for the original item and being presented with a list of items that people who bought that item also bought. In the case of a series of books, such a list may contain other books in the same series, other books in other series by the same author, books with similar content (e.g., in the same genre), unrelated books, non-book items, etc. Such a list is often not in any coherent order and the user may have to open up detailed descriptions of the items to determine which item is the next book in the series. In some cases, even viewing detailed item information will not reveal whether a book is the next book in a series.

BRIEF SUMMARY

Some embodiments described herein provide a method of presenting for purchase, in a timely and useful manner, an item of media content that is part of a series. In some embodiments, a media viewing application provides a library of media items. In this library, in addition to individual media items, the media viewing application generates a series object that the user can interact with to display 1) representations of media items in a series that the user has already purchased and 2) representations of one or more media items in the series that are available for purchase, along with one or more controls to allow the user to purchase the items.

In some embodiments, the series object is generated in the library mode either when the user has purchased at least two items in the series or when the user has consumed (e.g., read, watched, etc.) at least a threshold amount of the content of a media item in the series. Once the series object is generated, it allows the user to access a series display mode. In some embodiments, the series display mode has two sub-modes 1) a "purchased item" mode that primarily displays representations (e.g., thumbnails) of media items in the series that have been purchased and 2) an all-in-series mode that displays representations of all items in the series, both all those items purchased and all those items available for purchase.

While the purchased mode primarily displays representations of media items that have already been purchased, in some embodiments, the purchased item mode displays representations of media items in addition to the purchased items. For example, in some embodiments, the purchased item mode also displays a representation of the next unpurchased item in the series along with one or more controls allowing the user to purchase that item directly from the series display mode in the library without opening a separate user interface for an online store. In contrast to the all-in-series mode, which displays representations of every unpurchased item in the series and every purchased item in the series, the purchased mode of some embodiments displays representations of all purchased items, and a single unpurchased media item. In some embodiments, the purchased item mode also displays representations of samples of media items in the series (e.g., excerpts from books or trailers for videos). The samples can be obtained in various ways in some embodiments. In some embodiments, the displayed next item representation includes one or more controls for downloading the sample. In some embodiments, in addition to or instead of interacting with the displayed next item to download a sample, a user can interact with a user interface of an online store to download a sample from the store.

Many of the figures below illustrate aspects of some embodiments with respect to electronic books (sometimes called "e-books" or just "books", herein). However, the methods can be applied to any type of media item in a series, including video, audio, games, or any other media item that a user can consume (e.g., read, watch, play, listen to, etc.).

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE FIGURES

The novel features of the invention are set forth in the appended claims. However, for purpose of explanation, several embodiments of the invention are set forth in the following figures.

DETAILED DESCRIPTION

Figure 1:
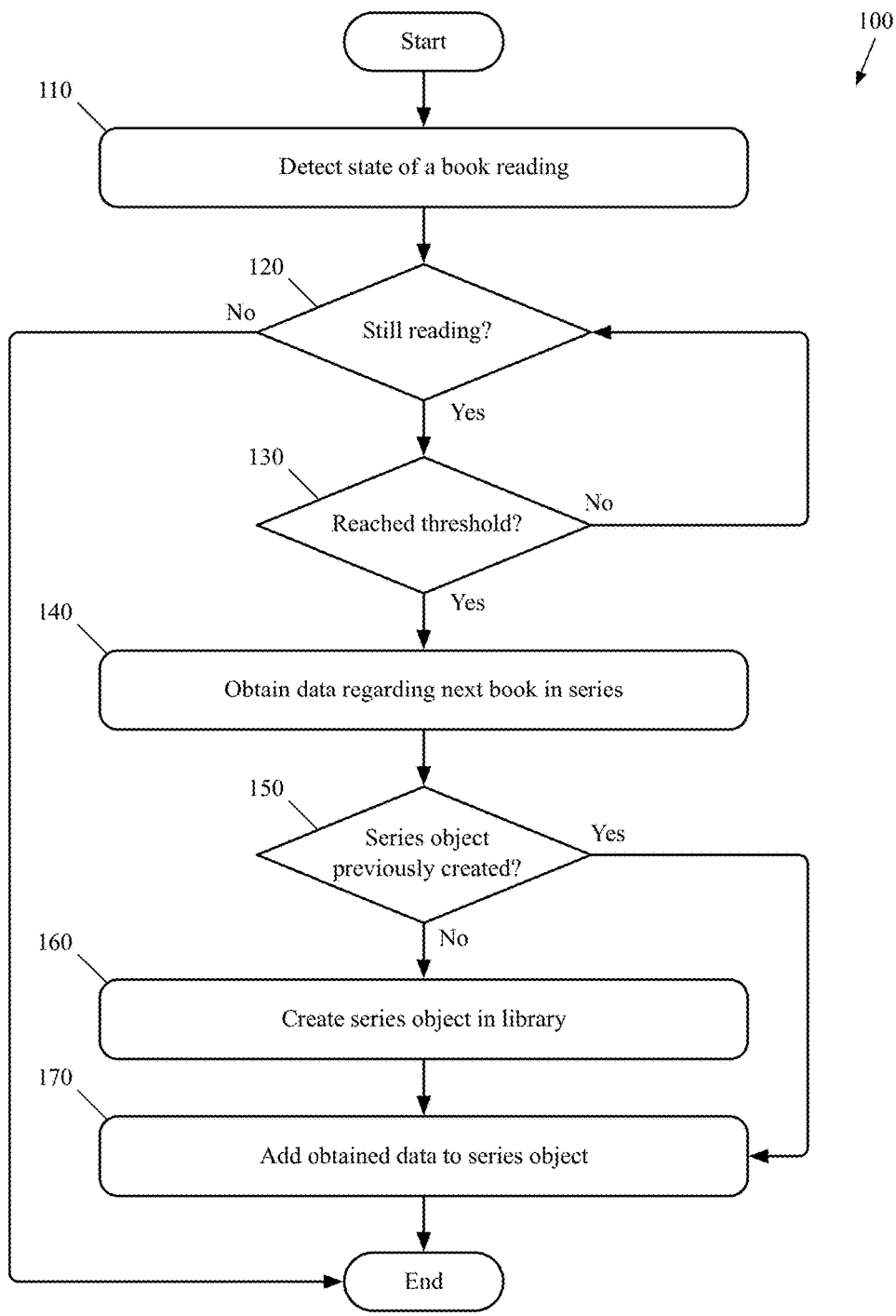
FIG. 1 conceptually illustrates a process of some embodiments for adding a next book in a series to a series object.

In the following detailed description of the invention, numerous details, examples, and embodiments of the invention are set forth and described. However, it will be clear and apparent to one skilled in the art that the invention is not limited to be identical to the embodiments set forth and that the invention may be practiced without some of the specific details and examples described. It will be clear to one of ordinary skill in the art that various controls depicted in the figures are examples of controls provided for reasons of clarity. Other embodiments may use other controls while remaining within the scope of the present embodiment. For example, a control depicted herein as being activated by a cursor control device may be activated by interacting with a touch-sensitive screen or some other method of providing input to an electronic device in some embodiments, or vice versa, even if not specifically mentioned. Similarly, the embodiments are not limited to using only the various indicators and icons depicted in the figures.

Some embodiments described herein provide a method of presenting for purchase, in a timely and useful manner, an item of media content that is part of a series. In some embodiments, a media viewing application provides a library of media items. In this library, in addition to individual media items, the media viewing application generates a series object that the user can interact with to display 1) representations of media items in a series that the user has already purchased and 2) representations of one or more media items in the series that are available for purchase, along with one or more controls to allow the user to purchase the items.

In some embodiments, the series object is generated either when the user has purchased at least two items in the series or when the user has consumed (e.g., read, watched, etc.) at least a threshold amount of the content of a media item in the series. Once the series object is generated, it allows the user to access a series display mode. In some embodiments, the series display mode has two sub-modes 1) a "purchased item" mode that displays representations (e.g., thumbnails) of media items in the series that have been purchased and 2) an all-in-series mode that displays representations of all items in the series, both purchased and available for purchase.

In some embodiments, the purchased item mode displays representations of media items in addition to the purchased items. For example, in some embodiments, the purchased item mode displays representations of the next unpurchased item in the series along with one or more controls allowing the user to purchase that item directly from the series display mode in the library without opening a separate user interface for an online store. In some embodiments, the purchased item mode also displays representations of samples of media items in the series (e.g., excerpts from books or trailers for videos). The samples can be obtained in various ways in some embodiments. In some embodiments, the displayed next item representation includes one or more controls for downloading the sample. In some embodiments, in addition to or instead of interacting with the displayed next item to download a sample, a user can interact with a user interface of an online store to download a sample from the store.

Many of the figures below illustrate aspects of some embodiments with respect to electronic books (sometimes called "e-books" or just "books", herein). However, the methods can be applied to any type of media item in a series, including video, audio, games, or any other media item that a user can consume (e.g., read, watch, play, listen to, etc.).

I. Generating and Populating the Series Object

Media consuming applications of some embodiments provide libraries of media items. In the libraries, the applications display representations of the media items available to the user. In some embodiments, the user interacts with these representations to launch a media player (e.g., a video or audio player, an e-book reader, etc.). The libraries of some embodiments automatically group media items that are in the same series into a series object and display a representation of the series object in the main library mode, rather than displaying every book in every series individually. In some embodiments, interacting with the series representation opens a series display mode (e.g., instead of or overlaid on the display of the library mode). In some embodiments, series objects are created either when a user has purchased two items in the same series and placed them in the same library, or when a user has consumed a threshold amount of a media item. When a user has purchased more than one media item in a series, the series display mode displays the purchased books. When the user has consumed more than a threshold amount of content, the series display mode displays purchased books in the series and a next book in the series available for purchase. In some embodiments, the series display mode includes a series display area that shows various media items in the series (e.g., some or all media items in the series) and does not show media items that are not in the series. In some embodiments, the application provides a library for e-books ("books").

FIG. 1 conceptually illustrates a process 100 of some embodiments for adding a next book in a series to a series object. The process 100 detects (at 110) a state of a book reading (e.g., whether or not the user is reading the book). While this operation is described in terms of the user reading the book, the process of some embodiments actually determines whether the user is proceeding through the book (e.g., scrolling through the lines, commanding the e-book reader to display pages, etc.), leaving the book open in the viewer, etc.

The process 100 determines (at 120) whether the user is still reading the book (e.g., whether the book is still open in the viewer). When the user is not reading the book (e.g., when the reader closes the book in the viewer, closes the viewer, etc.), the process 100 ends.

When the user is still reading the book, the process 100 determines (at 130) whether the user has reached a threshold level in reading the book. In some embodiments, determining whether the user has reached a threshold level in reading the book means determining that the user has opened a threshold percentage of the pages of the book in the viewer (e.g., has opened at least 75% of the pages). In some embodiments, determining whether the user has reached a threshold level in reading the book means determining that the user has opened a threshold number of the pages of the book in the viewer (e.g., has opened at least 50 pages). In some embodiments, the threshold is the lesser of a particular number of pages and a particular percentage of pages (e.g., the lesser of 50 pages and 75% of the book). In some embodiments, the threshold is the greater of a particular number of pages and a particular percentage of pages (e.g., the greater of 50 pages and 75% of the book).

The determination of whether the user has reached the threshold in some embodiments is based on the actual number of pages read (or number of lines read in some embodiments). In such embodiments, reading pages 26 to 100 of a 100 page book would meet a threshold of 75%, but reading pages 74 to 75 would not meet a threshold of 75%. In other embodiments, the determination of whether the threshold is reached is based on whether the user has reached or passed a certain page in the book. In such embodiments, opening the book to a single page would meet the threshold, as long as that page was greater than the threshold level (e.g., opening any page from 75 to 100 of a 100 page book would meet a threshold of 75%).

When the process determines (at 130) that the user has not reached the threshold, the process 100 returns to operation 120. On the other hand, when the process determines that the user has reached the threshold, the process 100 obtains (at 140) data regarding the next book in the series (if any). In other embodiments, the data about the next book in the series is automatically obtained when the purchase of the book being read is made (or downloaded later than shown in the figure), and the data is held in reserve until needed, rather than being downloaded once the threshold is reached.

The process 100 determines (at 150) whether a series object has already been created for the series that includes the book being read. In some embodiments, the series object would have previously been created if the user had already purchased at least two books in the series (and placed them in the same library). When the process 100 determines that the series object was previously created, the process 100 skips operation 160 and moves directly to operation 170. When the process 100 determines that the series object was not previously created, the process 100 creates (at 160) a series object in the library. In some embodiments, a representation of the series object replaces the representation of the existing book in the library and the representation of the existing book is added to the series object to be displayed in a series display area that the user can access by interacting with the series object. The process 100 then adds (at 170) the data obtained about the next book in the series to the series object for display when the user accesses the series display area. As mentioned above, in some embodiments, the data added to the series object about the next book in the series can be obtained at an earlier (or later) time than when the threshold is reached. The process after adding (at 170) the obtained data ends.

The library mode of some embodiments displays all owned books. In other embodiments, the library mode provides various options to display or hide one or more subsets of the owned books. In some embodiments, the library mode displays or hides various subsets based on tools or settings activated by a user. For example, in some embodiments, the library mode includes one or more tools or settings to activate options such as: (1) displaying all owned books, (2) displaying all downloaded books while hiding books that are not downloaded, even if they are owned by the user (e.g., books purchased by the user, but stored in the cloud or on a separate device), (3) displaying all series books but not single books, (4) displaying all single books, but not all series books, (5) displaying all series (e.g., as single books and/or series objects) where the user owns one or more books in the series but not all of the books in the series, etc. In some embodiments, before a series object is created, the library will display single books (e.g., a single book from a series when that single book is the only book the user owns in that series and single non-series books). One of ordinary skill in the art will understand that even after one or more series objects are created for one or more series, in some embodiments, the library mode will still display representations of single books for non-series books and/or for books where the user owns only one book in the series and has not triggered a display of representations of additional books in the serried (e.g., the user has not read a threshold amount of a single owned book in the series).

Figure 2:
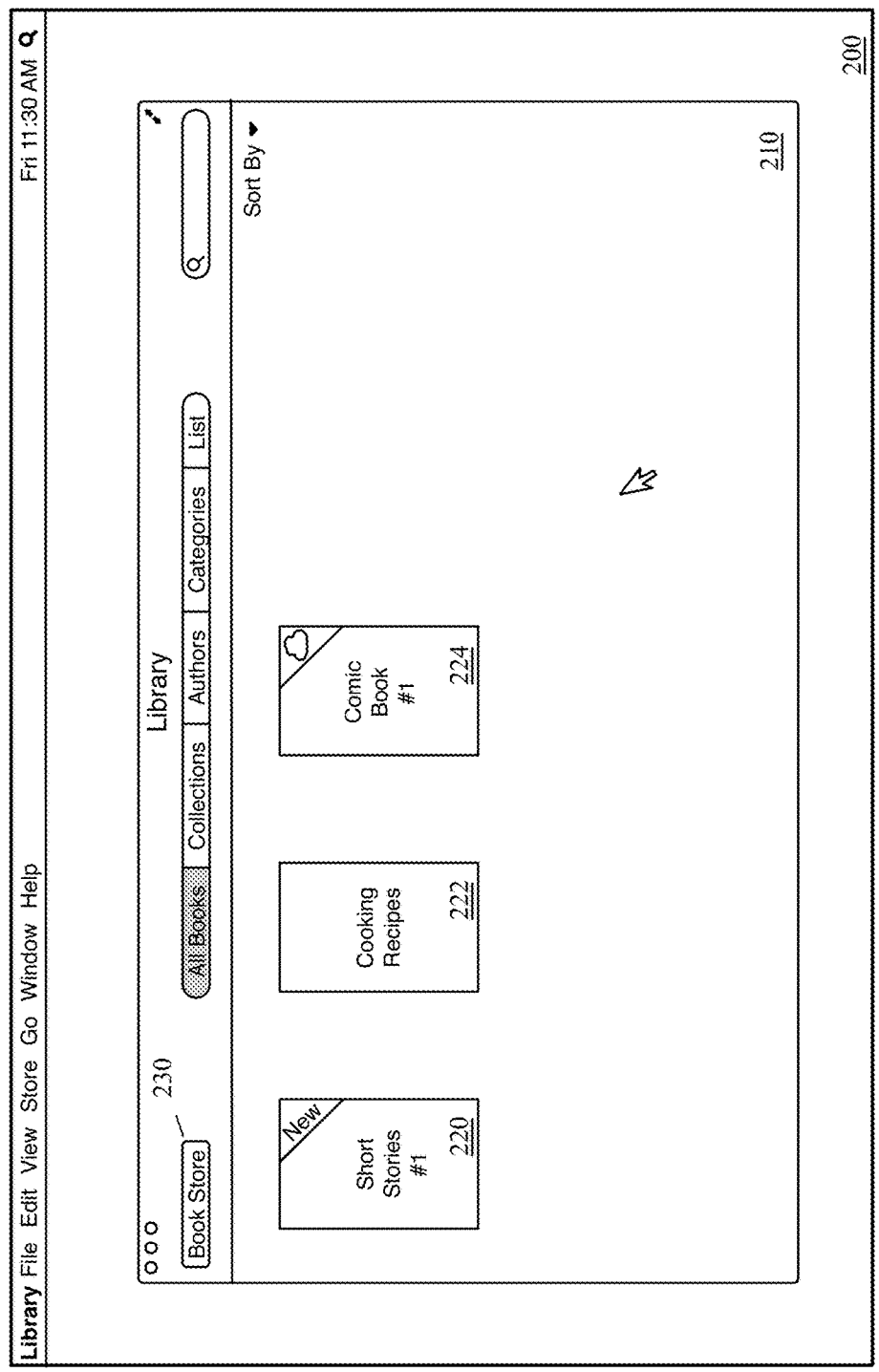
FIG. 2 illustrates a library mode of an e-book reader of some embodiments.

FIG. 2 illustrates a library mode of an e-book reader of some embodiments. The figure includes e-book reader 200, library display area 210, and e-book representations 220, 222, and 224. The e-book reader 200 provides multiple controls, including control 230 for accessing a store (e.g., to purchase e-books). In the figure, the e-book reader 200 displays the library display area 210. The library display area 210 is set to display representations 220-224 of all books in the library. Book representations 220 and 222 represent books presently stored in a storage medium of the device. The book representation 220 represents a book that has been purchased, but not yet opened. In the illustrated embodiment, such books are identified with a triangular box in the upper right corner that says "New". The book representation 222 represents a book that has been purchased and opened. Because the book represented by representation 222 has been opened, representation 222 does not have a "new" triangle. Book representation 224 represents a book that is not on the device, but can be downloaded from a network cloud to the device. In the illustrated embodiment, such books are represented with a triangular box in the upper right corner that shows a stylized image of a cloud.

In some embodiments, the book representations 220-224 are thumbnail (small) images of the cover art of the physical book corresponding to the e-book in the library, or another image associated with the e-book. In some embodiments, the representations 220-224 are text identifications of the books represented. In some embodiments, a default image and/or text is used when there is no image associated with an e-book and an image associated with the e-book is used when available.

In some embodiments, a user can open a book (e.g., open a window or full screen viewing mode for reading a book) by interacting with (e.g., clicking with a cursor control device, double-clicking, touching on a touch-sensitive screen, etc.) a book representation 220 or 222. In some embodiments, a user can download a book from the cloud (and in some such embodiments automatically open the book when the download is complete) by interacting with the book representation 224.

Figure 3:
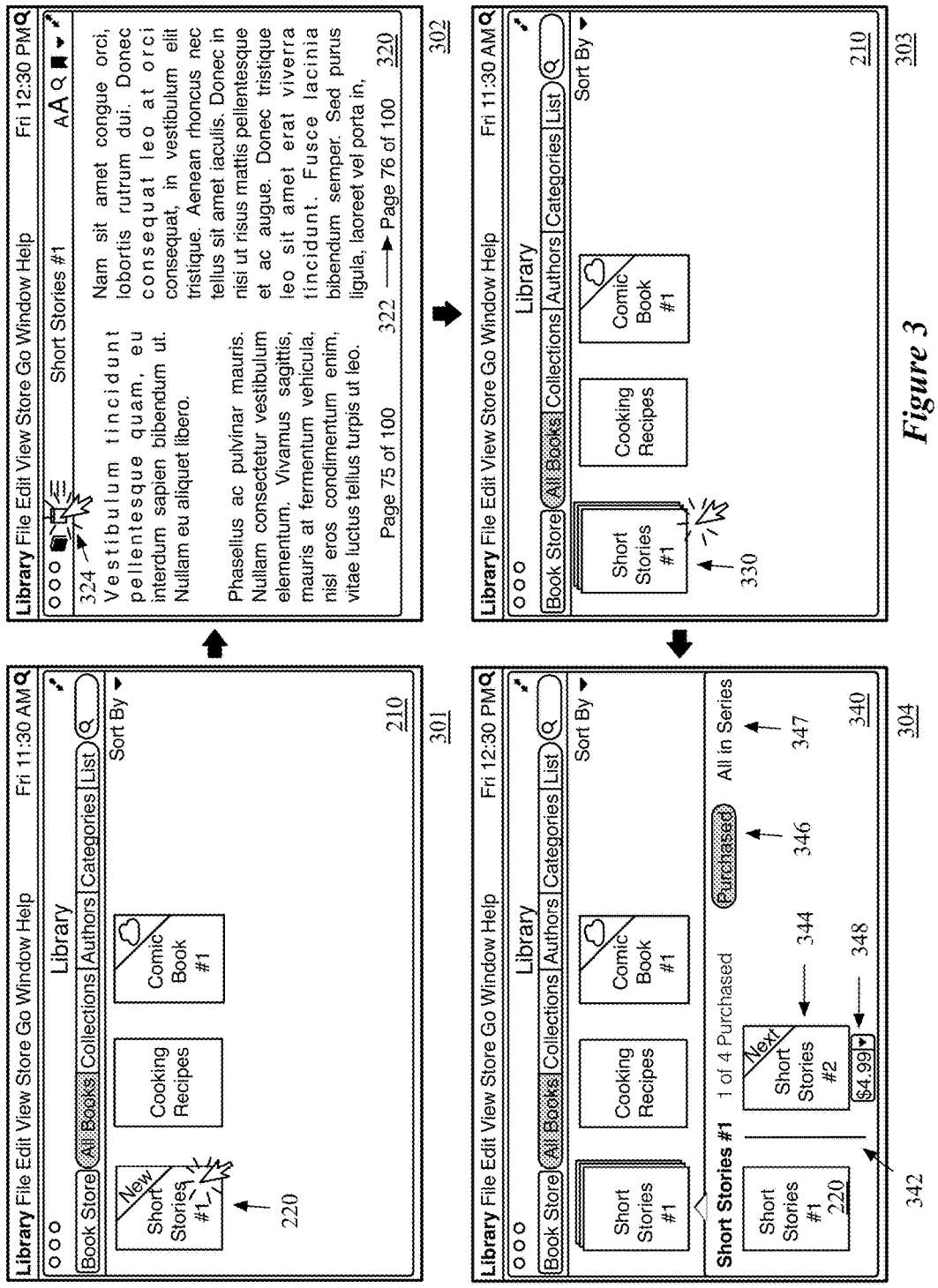
FIG. 3 illustrates the creation of a series object.

Once a user has more than one book in the same series in the library, or has read a threshold amount of the book, the application generates a series object in the library mode. FIG. 3 illustrates the creation of a series object in some embodiments. The figure is shown in 4 stages 301-304. In stage 301, an e-book reader is open in a library mode with library display area 210. As shown in stage 301, the user has selected the book representation 220 (by clicking on the book, as indicated by the short lines radiating from the cursor). Between stages 301 and 302, the user reads pages 1-76 of the book. Stage 302, in book reading mode 320, indicates the amount of the book that the user has read by the page number display 322. In stage 302, the user is activating a "return to library" control 324. The return to library control 324, when activated, closes the book reading mode and re-opens the library display area 210.

Stage 303 illustrates the e-book reader application returning to library mode, with library display area 210, after a threshold number of pages have been read (here, 75% of the 100 pages in the book). Because the threshold has been met, the book representation 220 has been replaced with series representation 330. In the illustrated embodiment, a series object is represented by the representation of the last (in series order) book in the series (here, "Short Stories #1" is the first and last item in the series at this point) that is in the library along with an indicator that there is a series of items, rather than a single item. Here, a series object is visually differentiated from a book representation by a stylized view of the edges of a stack of items as captured from above and to the right of the stack of items. The stylized view is shown as multiple sets of perpendicular lines above and to the right of the image representing the most recently purchased book.

In some embodiments, other indicators of a series are used (e.g., other text or image adjustments to identify a series object). In yet other embodiments, even though the behavior of a series object (e.g., the results of interactions with the object) is different from the behavior of a book representation, the representation of the series object in book mode is not visually distinguished from a book representation.

In stage 303, the user selects the series representation 330 (e.g., by clicking the series representation 330). This interaction causes the library mode to open (in stage 304) a series display area 340 showing e-books in a series display mode (sometimes referred to as a series mode). The series display area 340 of the illustrated embodiment includes a triangular bump pointing at the series representation 330. In some embodiments, the bump indicates that the series display area is displaying books in the series represented by the series representation 330. The series display area 340 includes book representation 220, a dividing line 342, next available book representation 344, a control 346 for switching to, and indicating, "purchased mode" (purchased mode is active in stage 304 as shown by the highlight of control 346) and a control 347 for switching to, and indicating, all-in-series mode (all-in-series mode is inactive in stage 304). Controls 346 and 347 are described with respect to FIG. 5, below.

As previously mentioned, in the "purchased mode" the media viewing application shows representations of both purchased books and (when the threshold reading level has been reached) the next unpurchased book in the series. The dividing line 342 separates purchased book representations from unpurchased book representations. The next available book representation 344 includes an image associated with the represented book (e.g., an image of the cover art of a corresponding physical book, etc.) and a triangular area on the upper right corner of the book identifying the book as "Next". Here, the cover image includes the title of the book "Short Stories #2". The next available book representation 344 also includes a purchasing control 348, described further with respect to FIG. 4, below.

II. Purchasing Books in a Series Display Mode

Figure 4:
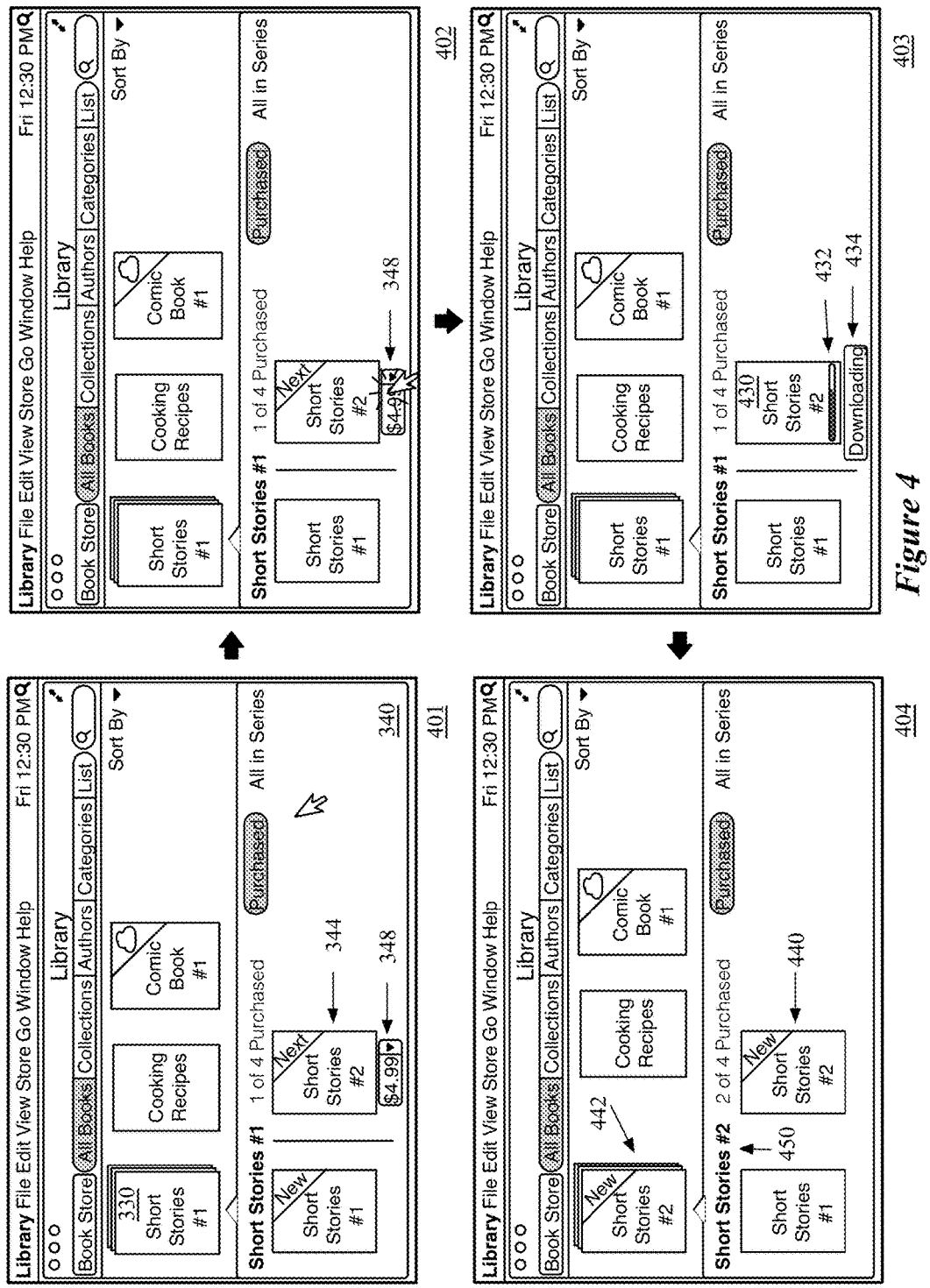
FIG. 4 illustrates the use of a purchasing control provided with a representation of a next unpurchased book in a series.

When a series object is generated and the next book is displayed, the applications of some embodiments provide a purchasing tool to allow the user to purchase the next book in the series. In some embodiments, the purchasing tool is activated by a user interacting with a purchasing control. FIG. 4 illustrates the use of a purchasing control provided with a representation of a next unpurchased book in a series. FIG. 4 is shown in stages 401-404. Stage 401 is identical to stage 304 of FIG. 3. In this stage 401, a series representation 330 has been activated and a series display area 340 has been opened. The series display area 340 includes next available book representation 344 with purchasing control 348. The purchasing control 348 of some embodiments displays a price of the book represented by book representation 344. The control 348 allows a reader to purchase a book at the displayed price (plus taxes and/or other fees in some embodiments) without leaving the library or entering a separate user interface of a store.

In stage 402, the purchasing control 348 is activated (e.g., with a click, double-click, etc.). Once the purchasing control 348 is activated, the e-book reader charges the cost of the book to a credit card associated with an e-book purchasing account of the user (not shown). The e-book reader then begins, in stage 403, to download the book represented by next available book representation 344. In the illustrated embodiment, the process of downloading of the e-book is visually indicated by download representation 430, which includes the same image associated with the book as the next available book representation 344. The download representation 430 also has a completion bar 432 that progressively fills in to indicate what fraction of the book has been downloaded. Under the download representation 430 is a box 434 with the word "Downloading" in it. In the illustrated embodiment, during the downloading process, the download representation 430 does not display the "next" triangle that was displayed in the upper right corner of the next available book representation 344. One of ordinary skill in the art will understand that in some embodiments, other indicators of a download in progress may be used.

After the book has fully downloaded, in stage 404, the newly downloaded book is represented by book representation 440. Because the book has not yet been opened in the media reader, the book representation 440 includes a "new" triangle in the upper right corner. In some embodiments, the series object includes an image associated with the last (fully downloaded) purchased book in the series. In stages 401-403, the last purchased book that was fully downloaded was the image associated with the first book in the series, so the series object was represented by series representation 330. Series representation 330 included an image associated with the first book in the series (e.g., the only book then owned). Because the newly downloaded book (Short Stories #2) is a later book in the series than the previously downloaded book (Short Stories #1), the representation 330 of the series object has been replaced with a representation 442, which shows the image associated with the newly downloaded book (the second book in the series). In the illustrated embodiment, when at least one book in the series is new (e.g., has not been opened yet), the series representation 442 will include a triangle indicating "new" in the upper right corner. In addition the dividing line 342 is removed because there are no longer any unpurchased book representations displayed in series display area 340.

The series display area 340 includes an indicator of how many books in the series have been purchased and how many books there are, in total, in the series. In this figure, the indicator states "1 of 4 purchased" in stages 401-403 indicating that there are four books, in total, in the series of which only one has been purchased. In stage 404, a second book has been purchased and downloaded and the indicator has been updated to state "2 of 4 purchased". In some embodiments, the series display area 340 includes a title 450.

In the embodiment of FIG. 4, both the title 450 and the series representation 442 display data (visual and/or textual) relating to the most recently purchased book in the series. However, in some embodiments, the title 450 and/or the series representation 442 indicates one of (1) the title of the first book in the series, (2) the title of the most recently purchased book in the series, (3) the title of the highest numbered purchased book in the series, or (4) an overall title of the series that may be different from the titles of any of the individual books in the series. In some embodiments, one of the above listed indicators is a default indicator, but in the absence of data for the default indicator, the title 450 and/or the series representation 442 will indicate another of the listed indicators, a modified form of another of the indicators (e.g., the title of the first book in the series followed by the word "series") or some other indicator. For example, the library display mode of some embodiments default to displaying an overall series title when such a title is provided, but will display the title of the first or last purchased book in the series if an overall series title is not provided.

Figure 5:
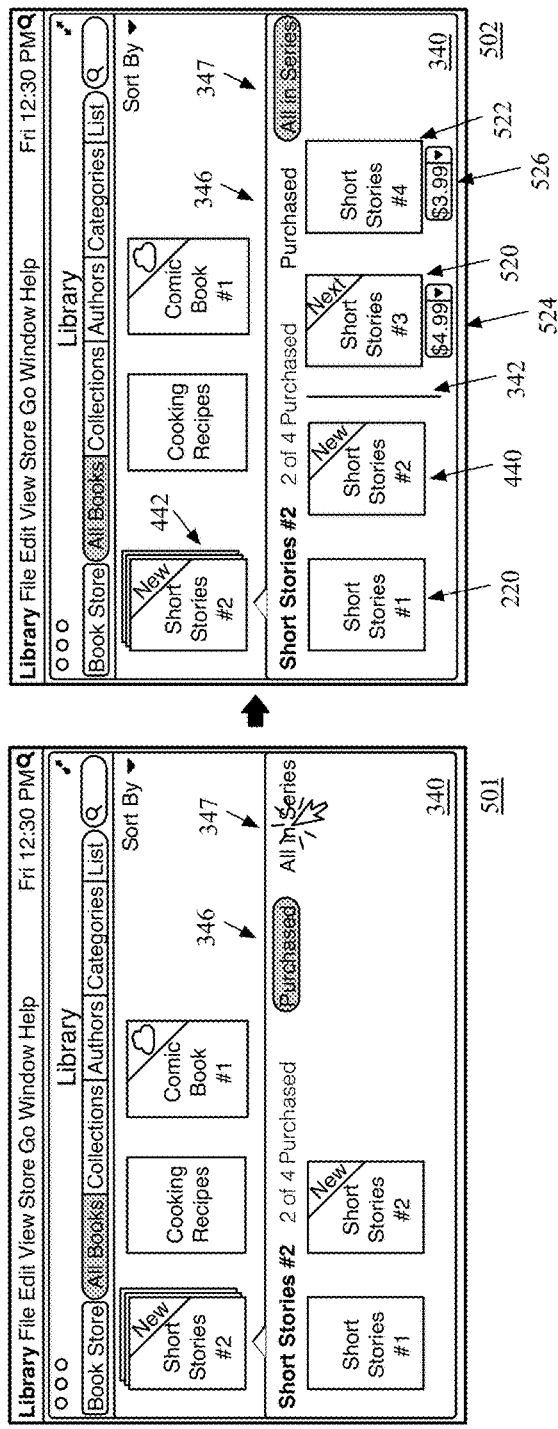
FIG. 5 illustrates a series display area of an e-book reader with an all-in-series control.

In some circumstances, a user may want to download additional books in a series before reaching a threshold level in an earlier book in the series. Accordingly, some embodiments provide a user with a control to display additional books in a series at any time, if there are any additional books in the series. FIG. 5 illustrates a series display area of an e-book reader with an all-in-series control. The figure includes stages 501 and 502, which illustrate the state of the series display area 340 under different settings of controls 346 and 347. As described with respect to FIG. 3, control 346 activates the purchased mode and control 347 activates the all-in-series mode. In stage 501, the series display area 340 is set to purchased mode (as indicated by the highlight of purchased control 346). The user selects the all-in-series mode of the series display area 340 (e.g., by clicking on the all-in-series control 347).

The display area 340 then switches to all-in-series mode in stage 502. In the all-in-series mode, the all-in-series indicator, control 347, is highlighted. The purchased books are still represented by book representations 220 and 440 in all-in-series mode. The dividing line 342 returns between the representations of purchased books and the representations of unpurchased books. On the right of dividing line 342, representations 520 and 522 of the third and fourth books in the series are shown. Because the third book in the series is the next unpurchased book in the series, the representation 520 of the third book in the series includes a "next" triangle in the upper right corner. Because the fourth book in the series is neither next, purchased, a sample, or only in the cloud it does not include a triangle indicator. The representations 520 and 522 include purchasing controls 524 and 526, respectively, indicating the purchase price of the e-books. Because the third and fourth books of the series have not yet been downloaded, the series representation 442 continues to include an image associated with the second (and highest purchased number) book in the series. Although the stages 501 and 502 are shown in a particular order, one of ordinary skill in the art will realize that either order is possible and a user can switch from all-in-series mode to purchased mode by selecting the purchased control 346 while in all-in-series mode.

III. Downloading Samples of Books in a Series Display Mode

Figure 6:
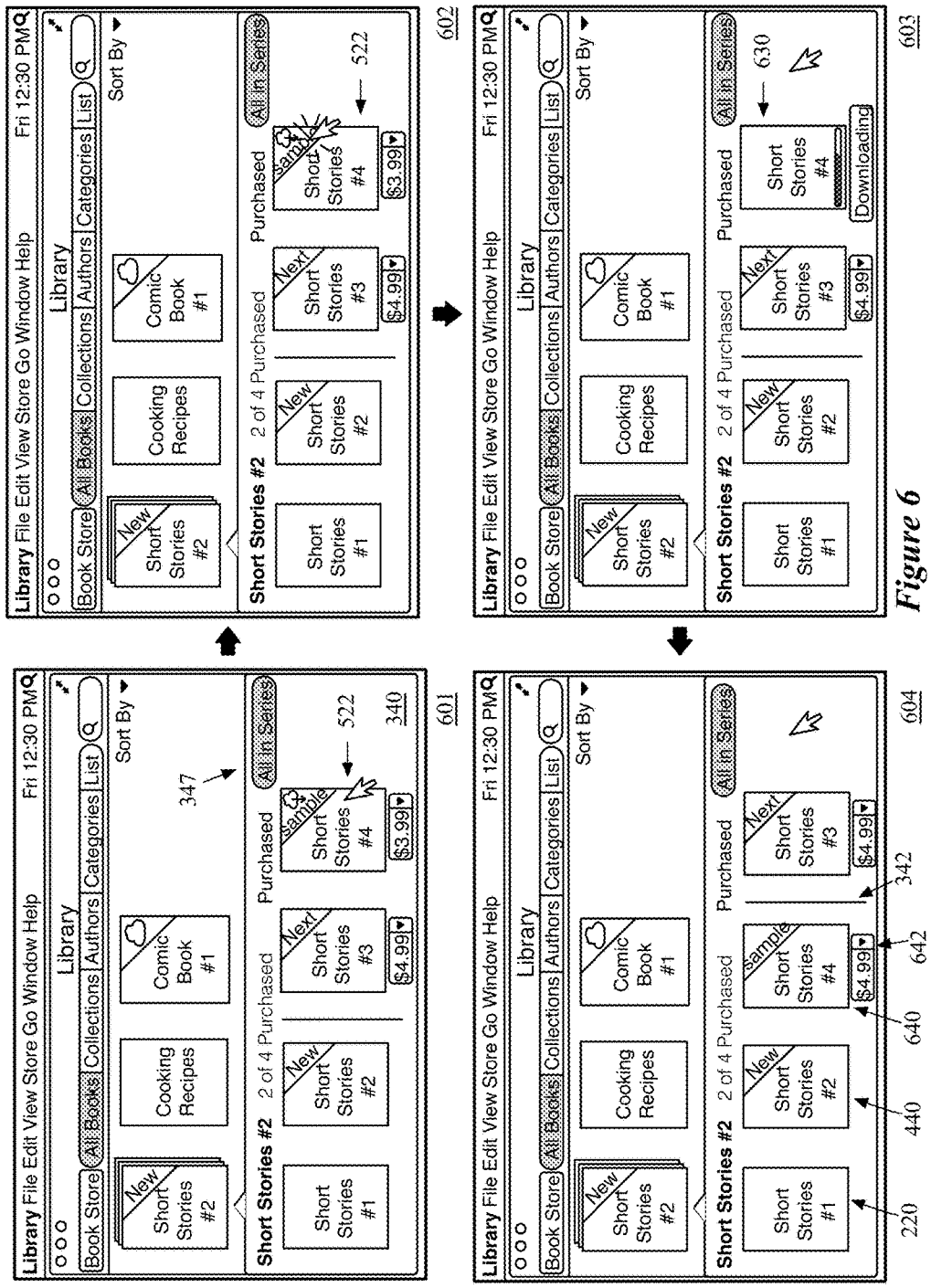
FIG. 6 illustrates an interface of some embodiments for downloading samples of books before purchasing them.

In some cases, a user may want more information about a book before making a decision to purchase it. Accordingly, in some embodiments, a seller can select a sample of the book which the user can download to read before deciding to purchase the entire book. FIG. 6 illustrates an interface of some embodiments for downloading samples of books before purchasing them. The figure is illustrated in stages 601-604. In stage 601, a user has moved a cursor (e.g., with a cursor control device) over unpurchased book representation 522 in the series display area 340. As a result of moving the cursor over the book representation, the book representation has changed by adding (in the upper right corner) a triangle labeled "sample" and with a stylized image of a cloud with a download arrow. In this stage, the control 347 is activated, setting the series display area to the all-in-series mode. However, in some embodiments, moving a cursor over an unpurchased book representation, while the series display area is in purchased mode, also results in a sample triangle being displayed on the representation of the unpurchased book.

Various embodiments allow various means for activating a sample download. In the illustrated embodiment, in stage 602, the sample download is triggered by clicking on the sample triangle of representation 522. However, in some embodiments, in addition to or instead of activating the download in response to a click on the triangle, the sample download can be activated by double-clicking on the representation 522, clicking on the representation 522, double-clicking on the sample triangle, and/or by other control operations (e.g., use of hotkeys, etc.).

In stage 603, the selected sample is downloading as indicated by downloading representation 630. In some embodiments, the same type of downloading representation is used for the sample as for a full download of a purchased book. In other embodiments, a different type of downloading representation is used. For example, in some embodiments, the downloading representation of a sample includes a sample triangle in the upper right corner, but the download representation of a book does not.

In stage 604, the download is complete and a sample representation 640 is displayed with the purchased books on the left side of the dividing line 342. Because the book itself has not yet been purchased, the sample representation includes a purchase control 642, which can be activated to purchase the full book. The sample representation 640 is further distinguished from the book representations 220 and 440 by a triangle in the upper right corner with the word "sample" in it. However, because the sample has already been downloaded, this sample triangle does not include a cloud download symbol. Although in the illustrated embodiment, the sample representation 640 is displayed to the left of dividing line 342 (because the sample is already available on the device) in some embodiments, sample representations are displayed on the right side of dividing line 342 with the other representations of unpurchased books.

The above described figures implement an embodiment that uses a cursor control device (e.g., a mouse control for an embodiment running on a computer) to interact with the controls of the application. However, other embodiments use touch-sensitive screens for input. Some features of such embodiments are described with respect to FIGS. 7 and 8, below.

IV. Series Display and Purchasing on Alternate Devices

The above described embodiments are able to function on any suitable platform, including laptops, desktops, tablets, and smartphones. However, in order to improve the user experience on smaller screens, some embodiments provide alternate interfaces for different devices. One of ordinary skill in the art will understand that the features described in detail above are available in the tablet and smartphone interfaces of some embodiments. Furthermore, in some embodiments, laptop/desktop applications of some embodiments use features described with respect to the tablet and smartphone applications described below. In the embodiments shown in FIGS. 3-6, above, the desktop application displays the series display mode alongside other items in the library. In contrast, in some embodiments, the series display mode in a desktop application replaces the display area of the library (in a similar manner to the smartphone interface illustrated in FIG. 7, below).

Figure 7:
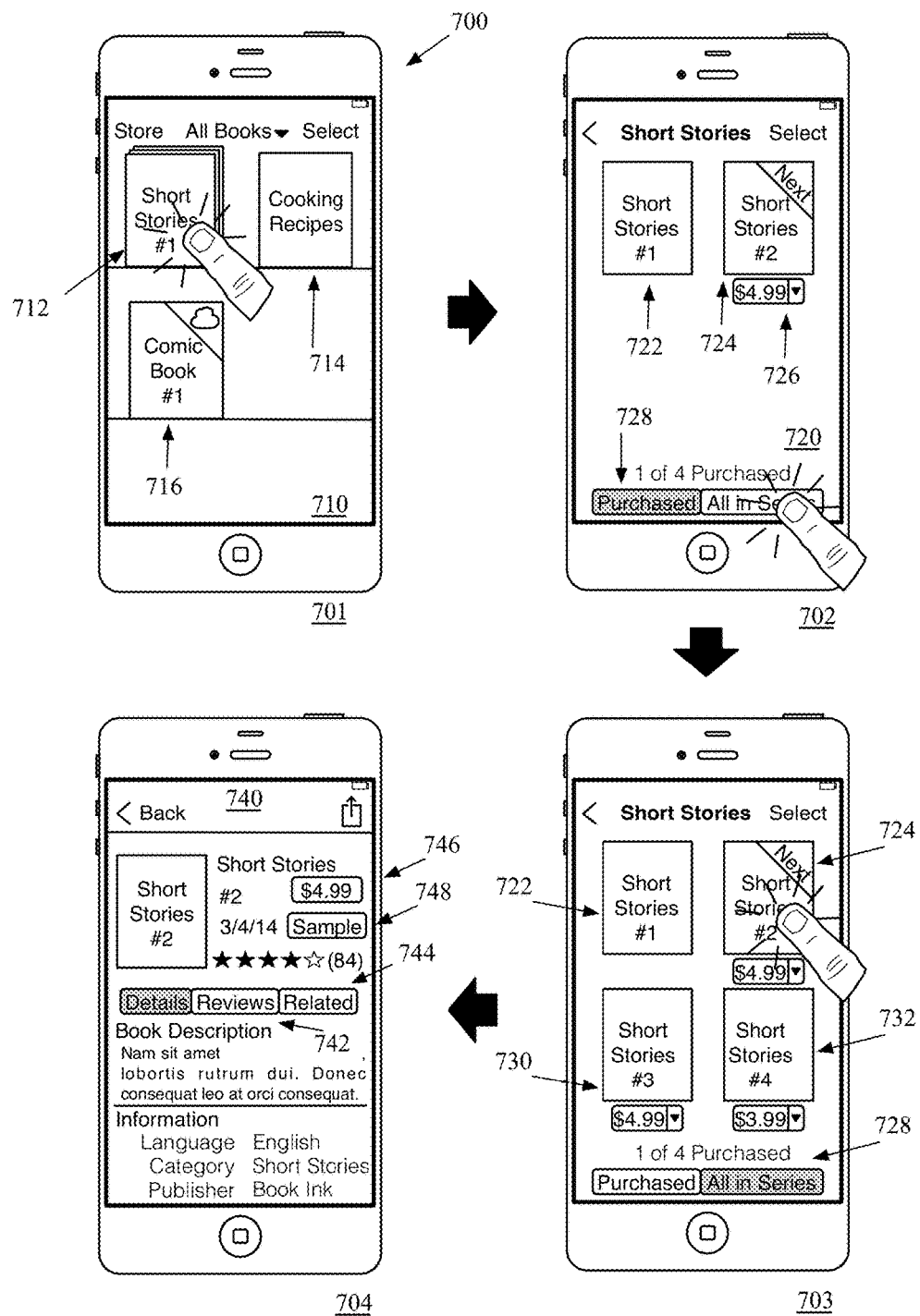
FIG. 7 illustrates an embodiment of an e-book reader with series purchasing options in a library mode implemented on a touchscreen device (e.g., a smartphone).

FIG. 7 illustrates an embodiment of an e-book reader with series purchasing options in a library mode implemented on a touchscreen device (e.g., a smartphone). The figure is shown in stages 701-704. Stage 701 includes a smartphone 700 with an e-book reader application running in the foreground in library mode 710. The library mode 710 displays a series representation 712, a representation 714 of a book stored on the smartphone 700 and a representation 716 of a purchased book stored in the cloud (indicated by the cloud symbol in the upper right corner of the representation 716).

In some embodiments, a series representation is shown either: 1) when a threshold amount of the book has been read (or accessed) in a similar manner as described with respect to FIG. 3, above; or 2) when at least two books in the series have been purchased. In the case illustrated in FIG. 7, the series representation 712 is shown because the user has already accessed (e.g., read, paged through, etc.) a threshold amount of the first book in a series of books, in a similar manner as described with respect to stage 302 of FIG. 6. In stage 701, a user selects the series representation 712 (e.g., with a finger touch on a touch-sensitive screen of the smartphone 700).

The selection of the series representation 712 causes a series display mode 720 to be displayed in stage 702. Because of the smaller size of a smartphone display screen compared to some other computer display screens (e.g., a desktop screen), the series display mode 720 is shown in the entire screen, rather than in part of the library as was the case in the embodiments shown in FIGS. 3-6. The series display mode includes book representation 722 (of the first book in a series, already read at least as far as the threshold level for generating a series object) and next book representation 724. The next book representation 724 includes a "next" triangle in the upper right corner and a purchasing control 726 for purchasing the book (e.g., by touching the purchasing control 726 on the touch-sensitive screen to trigger a charge to an account associated with that user and a download of the e-book).

The series display mode 720 also includes a control 728 with two sides for switching between purchased and all-in-series modes. In stage 702, the control 728 is set to purchased mode (as indicated by the highlight of the purchased side of control 728). Accordingly, only the first book in the series (which has been purchased) and the next book in the series (shown because a threshold amount of the first book has been read) are displayed. In stage 702, the user activates the all-in-series mode by selecting the all in series side of control 728 (e.g., with a finger touch on a touch-sensitive screen of the smartphone 700). Activating the control 728 in stage 702 causes the series display mode to transition to all-in-series mode in stage 703. The series display mode 720 also includes an indicator of how many books in the series have been purchased and how many books there are, in total, in the series. In this figure, the indicator states "1 of 4 purchased" indicating that there are four books, in total, in the series of which only one has been purchased.

In stage 703, the all-in-series mode is active (as shown by the highlight of the all in series side of control 728). Accordingly, representations of both the purchased (representation 722) and unpurchased books (representations 724, 730 and 732) of the series are displayed. The user selects representation 724 (by touching the representation 724 on the touch-sensitive display of the smartphone 700).

In the illustrated embodiment, selecting a representation of an unpurchased book opens, in stage 704, a detail mode 740 that displays additional details about the unpurchased book. In some embodiments, the detail mode 740 includes a description of the book, a user rating of the book (here, 4 out of 5 stars), and other information (e.g., language, category, publisher, etc.). In some embodiments, the detail mode 740 includes a control 742 for viewing reviews of the book and a control 744 for displaying related books. In some embodiments, the detail mode 740 includes a purchase control 746 that displays the purchase price of the book. In some embodiments, when the purchase control 746 is selected the book is purchased by charging an account associated with the user. The e-book is then downloaded to the smartphone. A touch screen of a smartphone does not include a cursor that can "hover" over a representation to activate a sample triangle (as was done to representation 522 in stage 601 of FIG. 6). Accordingly, in the smartphone embodiment of FIG. 7, the sample download control 748 is displayed in the detail mode 740. When activated, the sample download control 748 causes the e-book reader to download a sample of the selected book (here, a sample of "Short Stories #2").

Figure 8:
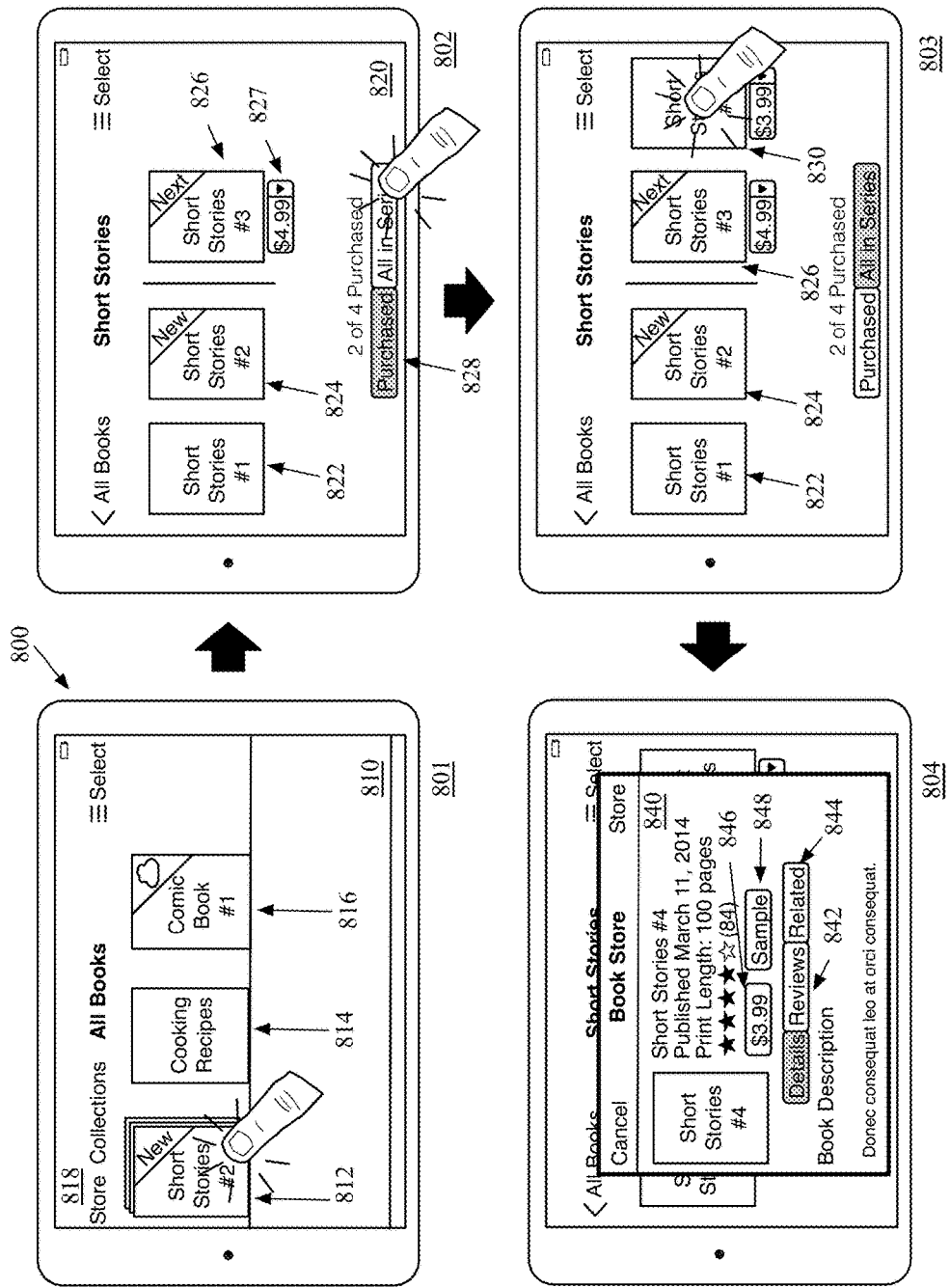
FIG. 8 illustrates an embodiment of an e-book reader with series purchasing options in a library mode implemented on a large touchscreen device (e.g., a tablet).

FIG. 8 illustrates an embodiment of an e-book reader with series purchasing options in a library mode implemented on a large touchscreen device (e.g., a tablet). The figure is shown in stages 801-804. Stage 801 includes a tablet 800 with an e-book reader application running in the foreground in library mode 810. The library mode 810 displays a series representation 812, a book representations 814 of a book stored on the tablet 800 and a book representation 816 of a purchased book stored in the cloud (indicated by the cloud symbol in the upper right corner of the representation 816).

In some embodiments, a series representation is shown either: 1) when a threshold amount of the book has been read (or accessed) in a similar manner as described with respect to FIG. 3, above; or 2) when at least two books in the series have been purchased. In the case illustrated in FIG. 8, the series representation 812 is shown because the user has already purchased the first and second books in the series in this example. Additionally, (as indicated by the presence of a "next item" in the series display mode in stage 802) the user has also accessed (e.g., read, paged through, etc.) a threshold amount of the first book in the series of books, e.g., as described with respect to stage 302 of FIG. 6. In stage 801, a user selects the series representation 812 (e.g., with a finger touch on a touch-sensitive screen 818 of the tablet 800).

The selection of the series representation 812 causes a series display mode 820 to be displayed in stage 802. Because of the smaller size of a tablet display screen compared to some other computers display screens (e.g., a display screen of a desktop computer), the series display mode 820 is shown in the entire screen, in this embodiment, rather than in part of the library as was the case in the embodiments shown in FIGS. 3-6. The series display mode includes book representation 822 (of the first book in a series), book representation 824 (of the second book in the series), and unpurchased book representation 826. The book representation 824 includes a "new" triangle in the upper right corner, indicating that the second book has not been opened. The unpurchased book representation 826 includes a "next" triangle in the upper right corner and a purchasing control 827 for purchasing the book (e.g., by touching the purchasing control 827 to trigger a charge to an account associated with that user and a download of the e-book).

One characteristic of the method of displaying the next unpurchased book in a series after a threshold amount of a previous book has been read, is that it is possible in some embodiments to see a third book (or later) in a series as a "next" book, when the second book has not been opened (as shown here). For example, if a user buys both the first and second books in a series before reaching the threshold for displaying the next book in a purchased mode and subsequently reads enough of the first book to pass the threshold, then the next unpurchased book in the series (e.g., the third book) will be identified as the next book (as in stage 802 of FIG. 8). In contrast, if a user reads enough of the first book to pass the threshold without first purchasing the second book, then the second book will be identified as the next book. In some embodiments, if the second book is then purchased, then a representation of the third book will not be displayed in the purchased mode until the user reads a threshold amount of the second book. The series display mode 820 also includes an indicator of how many books in the series have been purchased and how many books there are, in total, in the series. In this figure, the indicator states "1 of 4 purchased" indicating that there are four books, in total, in the series of which only one has been purchased.

The series display mode 820 also includes a control 828 for switching between purchased and all-in-series modes. In stage 802, the control 828 is set to purchased mode (as indicated by the highlight of the purchased side of control 828). Accordingly, only the first two books in the series (which have been purchased) and the next book in the series (shown because a threshold amount of the first book has been read) are displayed. In stage 802, the user activates the all-in-series mode by selecting the all in series side of control 828 (e.g., with a finger touch on a touch-sensitive screen of the tablet 800). Activating the control 828 in stage 802 causes the series display mode to transition to all-in-series mode in stage 803.

In stage 803, the all-in-series mode is active (as shown by the highlight of the all in series side of control 828). Accordingly, representations of both the purchased (representations 822 and 824) and unpurchased books (representations 826 and 830) of the series are displayed. The user selects representation 830 (by touching representation 830 on the touch-sensitive display 818 of the tablet 800).

In the illustrated embodiment, selecting a representation of an unpurchased book opens, in stage 804, a detail mode 840 that displays additional details about the unpurchased book. In FIG. 7, the detail mode 740, on the smaller display of a smartphone, was displayed over the entire display. Here, the detail mode 840, on the larger tablet screen, is shown as a pop-up over the series mode 820. In some embodiments, the detail mode 840 includes a description of the book, a user rating of the book (here, 4 out of 5 stars), and other information (e.g., publication date, book length, etc.). In some embodiments, the detail mode 840 includes a control 842 for viewing reviews of the book and a control 844 for displaying related books. In some embodiments, the detail mode 840 includes a purchase control 846 that displays the purchase price of the book. In some embodiments, when the purchase control 846 is selected the book is purchased by charging an account associated with the user. The e-book is then downloaded to the tablet. A touch screen of a tablet does not include a cursor that can "hover" over a representation to activate a sample triangle (as was done to representation 522 in stage 601 of FIG. 6). Accordingly, in the tablet embodiment of FIG. 8, the sample download control 848 is displayed in the detail mode 840. When activated, the sample download control 848 causes the e-book reader to download a sample of the selected book (here, a sample of "Short Stories #4").

Although the stages 802 and 803 are shown in a particular order, one of ordinary skill in the art will realize that either order is possible. That is, a user can switch from all-in-series mode to purchased mode by selecting the purchased side of control 828 while in all-in-series mode.

V. Providing Series Objects in Libraries of Media Items

The preceding figures show embodiments that provide a series object in a library. The series object provides the next book in a series of books for purchase. However, some embodiments provide series objects for media items other than books. That is, some embodiments provide a media consuming application with a media item library with media items other than books (e.g., videos, audio files, etc.). The media item library of such embodiments provides a purchasing control for the next media item in a series of media items to a user. For example in some embodiments, an application provides a library with representations of video clips (e.g., movies, TV show episodes, etc.). The application then displays a representation of the next item in a video series (e.g., a sequel to a movie, a next episode of a TV show, etc.).

Figure 9:
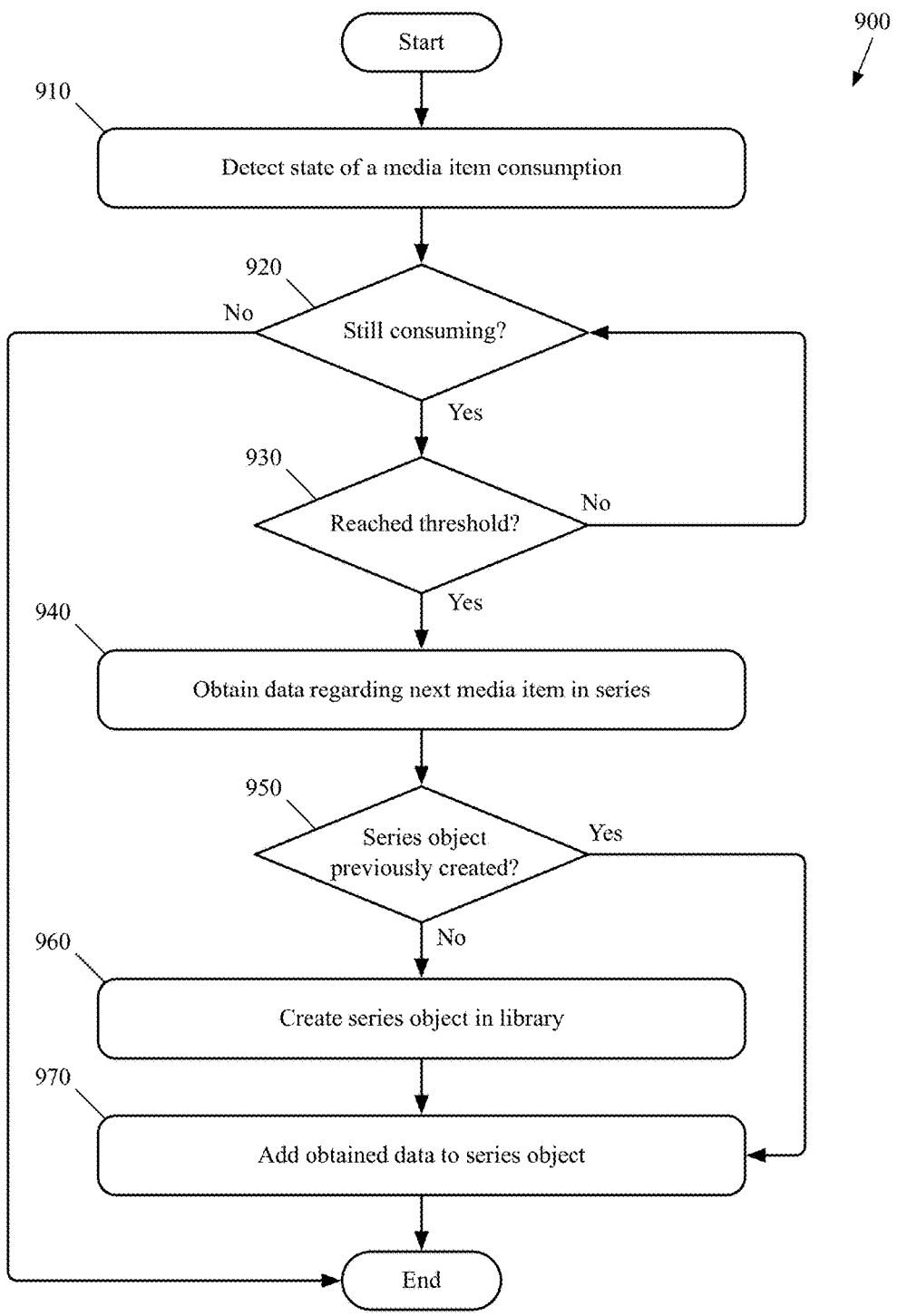
FIG. 9 conceptually illustrates a process of some embodiments for adding a next media item in a series to a series object.

The above figures used books as an example of media items. However, the processes and features described above apply to embodiments that display other types of media, instead of or in addition to books. FIG. 9 conceptually illustrates a process 900 of some embodiments for adding a next media item in a series to a series object. The process 900 detects (at 910) a state of a media item consumption (e.g., whether or not the user is using the media item, such as playing a video or audio file, displaying a book in a book reader, playing a game, etc.). While this operation is described in terms of the user consuming the media item, the process of some embodiments actually determines whether the user is proceeding through the media item (e.g., fast forwarding through a video or audio file, scrolling through the lines of a book, commanding the media player to jump ahead in the media item, etc.), leaving the media item open in the player, etc.

The process 900 determines (at 920) whether the user is still consuming the media item (e.g., whether the media item is still open in the player). When the user is not consuming the media item (e.g., when the reader closes the media item in the player, closes the player, etc.), the process 900 ends.

When the user is still consuming the media item, the process 900 determines (at 930) whether the user has reached a threshold level in consuming the media item. In some embodiments, determining whether the user has reached a threshold level in consuming the media item means determining that the user has consumed a threshold amount of the media item in the player (e.g., has watched at least 75% of a video clip, etc.). In some embodiments, determining whether the user has reached a threshold level in consuming the media item means determining that the user has played through a threshold portion of the media item in the player (e.g., has watched at least 30 minutes). In some embodiments, the threshold is the lesser of a particular amount of time and a particular percentage of the total length of the media item (e.g., the lesser of 30 minutes and 75% of the duration of the media item). In some embodiments, the threshold is the greater of a particular amount of time and a particular percentage of the total length of the media item (e.g., the greater of 30 minutes and 75% of the duration of the media item).

The determination of whether the user has reached the threshold in some embodiments is based on the actual amount of the media item consumed. In such embodiments, watching a 60 minute video from the beginning to 45 minutes would meet a threshold of 75%, but skipping minutes 15-44 and watching minutes 44-46 would not meet a threshold of 75%. In other embodiments, the determination of whether the threshold is reached is based on whether the user has reached or passed a certain time in the media item. In such embodiments, opening the media item to a single time would meet the threshold, as long as that time was after the threshold time (e.g., opening the media item at any time from 46 to 60 minutes of a 60 minute media item would meet a threshold of 75%).

When the user has not reached the threshold (at 930), the process 900 returns to operation 920. When the process determines (at 930) that the user has reached the threshold, the process 900 obtains (at 940) data regarding the next media item in the series (if any). In other embodiments, the data about the next media item in the series is automatically obtained when the purchase of the media item being consumed is made (or downloaded later than shown in the figure), and the data is held in reserve until needed, rather than being downloaded once the threshold is reached.

The process 900 determines (at 950) whether a series object has already been created for the series that includes the media item being read. In some embodiments, the series object would have previously been created if the user had already purchased at least two media items in the series (and placed them in the same library). When the process 900 determines that the series object was previously created, the process 900 skips operation 960 and moves directly to operation 970. When the process 900 determines that the series object was not previously created, the process 900 creates (at 960) a series object in the library. In some embodiments, a representation of the series object replaces the representation of the existing media item in the library and the representation of the existing media item is added to the series object to be displayed in a series display area that the user can access by interacting with the series object. The process 900 then adds (at 970) the data obtained about the next media item in the series to the series object for display when the user accesses the series display area. The process then ends. As mentioned above, in some embodiments, the data added to the series object about the next media item in the series can be obtained at an earlier (or later) time than when the threshold is reached.

Figure 10:
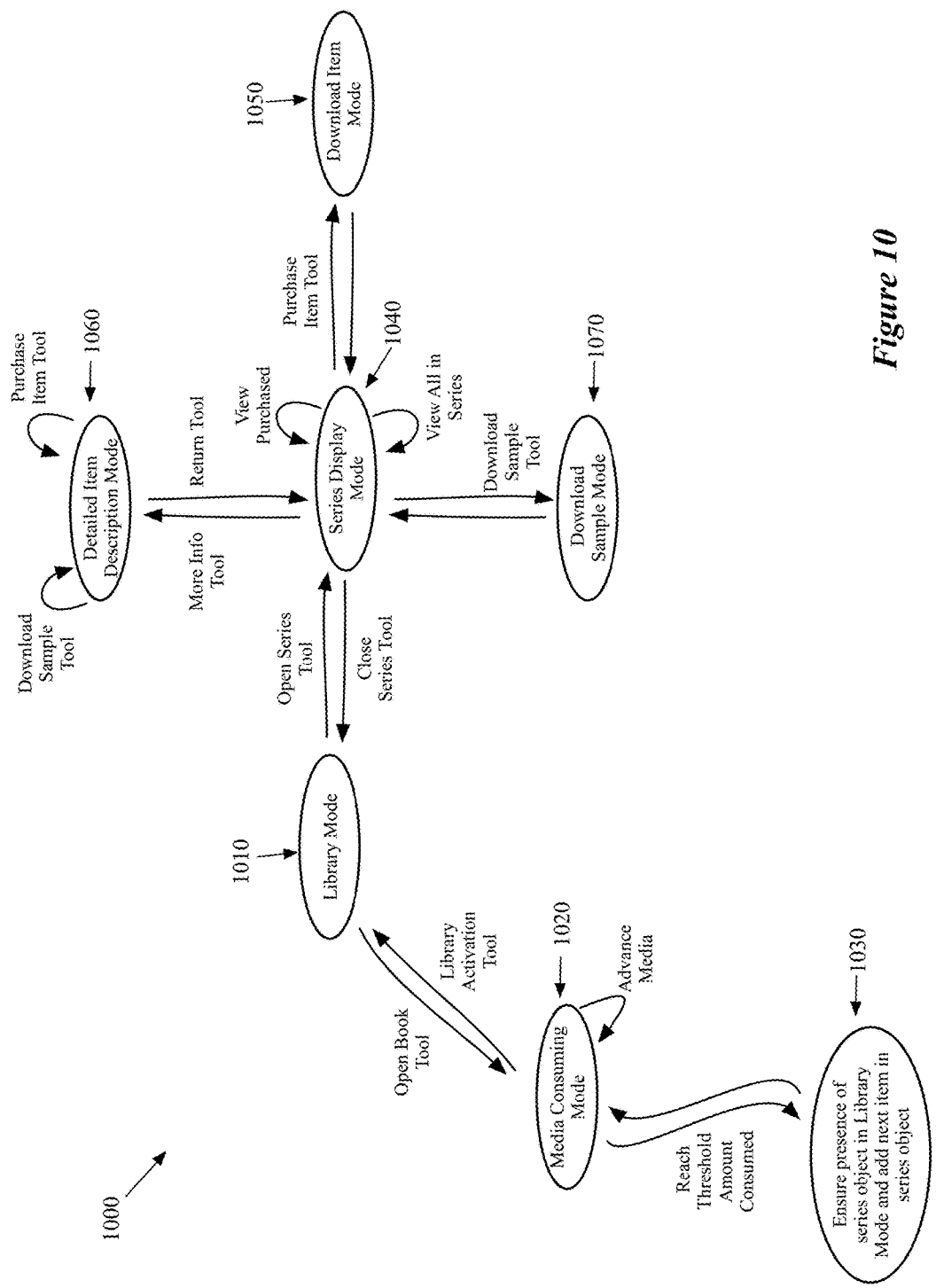
FIG. 10 conceptually illustrates a plurality of states of an application for providing a convenient means for identifying and purchasing sequential content.

FIG. 10 conceptually illustrates a plurality of states of an application 1000 for providing a convenient means for identifying and purchasing sequential content. The figure also illustrates the operations that cause the application to transition from one state to another. The figure includes seven states, a library mode 1010, a media consuming mode 1020, an add-to-series mode 1030, a series display mode 1040, a download item mode 1050, a detailed item description mode 1060, and a download sample mode 1070.

In the library mode 1010, the application 1000 displays representations of media items (e.g., books, videos, audio files, etc.). Examples of library modes are found as library display area 210 in FIG. 2, library mode 710 in FIG. 7, and library mode 810 in FIG. 8. Upon activation of an open item tool in library mode 1010 (e.g., by clicking or double-clicking on an image associated with a media item with a cursor control device), the application 1000 transitions to the media consuming mode 1020. Upon activation of an open series tool in library mode 1010, the application 1000 transitions to the series display mode 1040.

In the media consuming mode 1020, the application provides the media item for user consumption (e.g., displays a video item, plays an audio item, displays text and/or images of an e-book, etc.). An example of a media consuming mode is shown as book reading mode 320 in FIG. 3. In some embodiments, the media consuming mode 1020 plays automatically through the media unless the user stops or pauses the playing (e.g., automatically playing through a video or audio clip). In some embodiments, the media consuming mode 1020 proceeds through the media only when directed by the user (e.g., flipping pages in an e-book, changing slides in a slideshow, etc.). The application 1000 transitions out of the media consuming mode 1020 when the user uses a library activation tool and/or when such a tool is automatically activated (e.g., after a pre-determined delay after the end of a video or audio clip, etc.). The application 1000 transitions to an add-to-series mode 1030 once the user reaches a predetermined threshold of media consumption (e.g., after the user reads 75% of an e-book). In some embodiments, the application 1000 advances through the media item, while repeatedly returning to, or remaining in, the media consuming mode 1020 as the user activates an advance media operation.

When the application 1000 enters the add-to-series mode 1030, the application determines whether a series object already exists for the series that includes the media item being consumed. When the application 1000 determines that the series object doesn't already exist, the application 1000 adds the series object to be displayed in the library mode (as shown in operation 160 of FIG. 1). In some embodiments, the series object replaces the media representation (in the library mode) of the currently playing media item. When the series object already exists, the add-to-series mode 1030 skips the add object step (e.g., skipping operation 160 of FIG. 1). In either case, the add-to-series mode 1030 adds the next media item in the series as a purchasable item in the series display mode 1040. Examples of next media item include next available book representation 344 in FIG. 3, next book representation 724 in FIG. 7, and unpurchased book representation 826 in FIG. 8. Once the next media item is added to the series display mode 1040, the application automatically transitions back to media consuming mode 1020. In some embodiments, no visible indicator is provided while the application is in add-to-series mode 1030. Instead, the application displays the media consuming mode 1020, while applying the operations of add-to-series mode 1030 in the background. In other embodiments, a visual indicator of the operations of the add-to-series mode 1030 is provided. For example, in some embodiments the media consumption mode 1020 is displayed in one window, while in a second window, the library mode 1010 is displayed. In the second window, a representation of the series object replaces a representation of the currently playing (or being read, etc.) media item.

As described above, when a user activates an open series tool in the library mode 1010 (e.g., by clicking or double-clicking on a representation of the series object) the application 1000 transitions to the series display mode 1040. Examples of the series display mode are described in relation to stage 303 of FIG. 3, stage 702 of FIG. 7, and stage 802 of FIG. 8. In the series display mode of some embodiments, the application 1000 displays representations of the purchased books of the series along with additional books in the series, and/or samples of books in the series. The series display mode 1040 of some embodiments also provides controls (e.g., controls 346 and 347 of FIG. 3, control 728 of FIG. 7, and control 828 of FIG. 8) to switch the series display mode 1040 from showing 1) representations of purchased books, next available books, and samples to showing 2) representations of all books in the series. Activating one of these controls does not cause the application to leave the series display mode in some embodiments, but instead changes the contents displayed in the series display mode 1040.

The series display mode 1040 of some embodiments also includes a close series tool that causes the application 1000 to return to library mode 1010. In some embodiments a user activates this tool by clicking or double-clicking on the representation of the series object. In some embodiments the user activates this tool with a hotkey (e.g., "ESC"). In some embodiments, the user closes the series display mode 1040 by clicking on a portion of the screen with a visual indicator (e.g., a button).

As shown in stage 402 of FIG. 4, the series display mode 1040 of some embodiments provides a purchase item tool activated by a purchasing control (e.g., purchasing control 348 of FIG. 3, purchasing control 726 of FIG. 7, and purchasing control 827 of FIG. 8) for buying the media item. In some embodiments, when the user activates the purchasing control, the application 1000 transitions to a download item mode 1050. An example of the download item mode 1050 is shown in stage 403 of FIG. 4. In the download item mode 1050 of some embodiments, the application 1000 provides a display of download progress as the item is downloading. When the download is finished, the application 1000 returns to the series display mode 1040, with a representation of the newly purchased item indicating that it has been purchased (e.g., the purchasing control for that item has been removed, the representation of the item includes an indicator such as triangle displaying the word "new", etc.).

As shown in stages 803-804 of FIG. 8, in some embodiments, the series display mode 1040 provides a tool for displaying more information about a media item (e.g., by tapping on the representation of the media item, clicking the representation of the media item, etc.). Activating this tool cause the application to transition to the detailed item description mode 1060. Examples of the detailed item description mode 1060 are shown in stage 704 of FIG. 7 and stage 804 of FIG. 8. In some embodiments, the detailed item description mode provides tools for downloading a sample of a media item and/or purchasing the media item. In some embodiments, activating these tools causes the sample or media item to download in the background while the detailed item description mode remains in the foreground. The detailed item description mode of some embodiments includes a tool for returning to the series display mode 1040.

As shown in stage 402 of FIG. 4, the series display mode 1040 of some embodiments provides a purchase item tool activated by a purchasing control (e.g., purchasing control 348 of FIG. 3, purchasing control 726 of FIG. 7, and purchasing control 827 of FIG. 8) for buying the media item. In some embodiments, when the user activates the purchasing control, the application 1000 transitions to a download item mode 1050. An example of the download item mode 1050 is shown in stage 403 of FIG. 4. In the download item mode 1050 of some embodiments, the application 1000 provides a display of download progress as the item is downloading. When the download is finished, the application 1000 returns to the series display mode 1040, with a representation of the newly purchased item indicating that it has been purchased (e.g., the purchasing control for that item has been removed, the representation of the item includes an indicator such as triangle displaying the word "new", etc.).

As shown in stages 601-602 of FIG. 6, the series display mode 1040 of some embodiments provides a sample download tool (e.g., activated by clicking on a sample triangle of representation 522 in FIG. 6) for downloading a sample of the media item. When the user activates the sample download tool, the application 1000 transitions to a download sample mode 1070. An example of the download sample mode 1070 is shown in stage 603 of FIG. 6. In the download sample mode 1070 of some embodiments, the application 1000 provides a display of download progress as the sample is downloading. When the download is finished, the application 1000 returns to the series display mode 1040, with a representation of the newly downloaded sample indicating that it is a sample (e.g., the purchasing control for that item is still in place, the representation of the item includes an indicator such as triangle displaying the word "sample", etc.).

The various modes above are illustrated a separate modes. However, in some embodiments, more than one mode can be active at the same time. For example, in some embodiments, while one media item is downloading (in download item mode 1050) a user can simultaneously consume a media item in media consuming mode 1020.

One of ordinary skill in the art will understand that the purchase prices displayed in the above described figures can be in any currency designated by the seller (or buyer in some embodiments), and at any price level set by the seller. In some embodiments, additional controls are provided. For example, in some embodiments a "buy rest of series" control is provided with a price for the remaining books in the series. In some embodiments, at the discretion of the seller, the price for the remaining books in the series may be less than the aggregate individual prices of the remaining books in the series (i.e., a bulk discount may be applied). In some embodiments, additional controls are displayed after the activation of a purchase control. For example, in some embodiments, after a purchase control is selected, a confirmation control is displayed that requires the user to confirm that the purchase is intended. Such a confirmation control reduces the chance that a user will accidentally purchase an unintended item by a miss-click or mistakenly touching the wrong part of a touchscreen.

In the above figures, a limited number of media items were displayed in the library and a limited number of media items were displayed in the series display mode. In some embodiments, when more than a particular number of items (e.g., 6 items) are to be displayed in a series, the series display mode displays that particular number of items initially, while providing the user with a control (e.g., a scroll-bar) for viewing additional items.

In some embodiments, a series of media items can be any of a set of media items in a particular order. For example, a series can be a sequential series of books about a particular set of characters by a particular author. A series can also be an anthology of items on a particular subject by multiple authors (e.g., a series of books set in a common fictional setting). A series can be a set of books tied together by a common theme (e.g., a series of self-help books on different subjects by a particular publisher). In some embodiments, a series is whatever set of media items the seller of the media items chooses to identify as a series. In some embodiments, the next item in a series can be explicitly identified from a sequential order of items defined by the seller. In some embodiments, the next item in a series can be automatically identified based on the most popular item in the series that has not yet been purchased. In some embodiments, the next item in the series can be automatically identified based on the publication order of the items of the series. Some embodiments provide some or all of the above methods of identifying a next book in a series as options set by the seller of a given series.

In some embodiments, the media items include audio files that are part of larger audio works are available for purchase separately (e.g., individual songs from a musical album). In some such embodiments, the series object includes multiple songs from a single album and a next unpurchased song in the album is offered in a series object once a song has been played a threshold number of times, rather than when a threshold percentage of the song has been played. Additionally, in some embodiments, the series object can contain a series of albums (e.g., albums by the same artist). In some such embodiments, a next album in the series is offered for purchase in a series object when a particular number of songs from an album have been played (e.g., 75% of the songs on the album). In other such embodiments, a next album in the series is offered for purchase in a series object when songs from that particular album have been played a threshold number of times (e.g., playing 1 song 25 times, or 5 songs 5 times each, etc.).

In some embodiments, a series object can be nested within another series object. For example, the library of some embodiments displays a series object that represents a TV series. Interacting with the series object causes the application to display a series display area. The series display area contains representations of individual seasons of the TV series. Each season is itself a series object. Interacting with the TV season objects displays an additional series display area with representations of the individual episodes of that season of the series. In some embodiments, the additional series display area is displayed simultaneously with the first series object. In other embodiments the additional series display area is displayed instead of the first series display area. In some embodiments, any number of layers of series objects can be nested within other series objects.

While some examples of thresholds for displaying a next object in a series were provided in the above described figures, in some embodiments other threshold values are used (e.g., 10%, 25%, 50%, 90%, etc.). In some embodiments, the threshold level of consumption of a media item that triggers the display of a representation of the next item in the series is so low that opening the media item at all triggers the display of the representation of the next item. Furthermore, in some embodiments, merely purchasing an item in a series triggers the display of the next item in the series without any threshold level of consumption being required.

The above described embodiments include purchasing e-books and other media items. However, in some embodiments, the e-books are obtained in other ways in addition to or instead of purchasing them. For example, rather than purchasing an e-book for money (e.g., using cash, credit cards, store credit, debit cards, etc.), the user may use a coupon (e.g., a two for one coupon) or gift certificate (e.g., a gift certificate specific to a particular e-book, or a general gift certificate) to obtain an e-book. Similarly, in some cases a provider of e-books may give an e-book away for free (e.g., for publicity purposes).

The above described embodiments describe downloading e-books and other media items. However, in other embodiments e-books, digital media items, and/or hardcopies of books or media items stores on non-transitory machine readable media can be obtained through other avenues. For example, the media organizing applications of in some embodiments allow a user to have a hardcopy of a book or a copy of a media item on a non-transitory machine readable medium physically delivered, in addition to or instead of downloading a copy of the media item.

VI. Mobile Device

Figure 11:
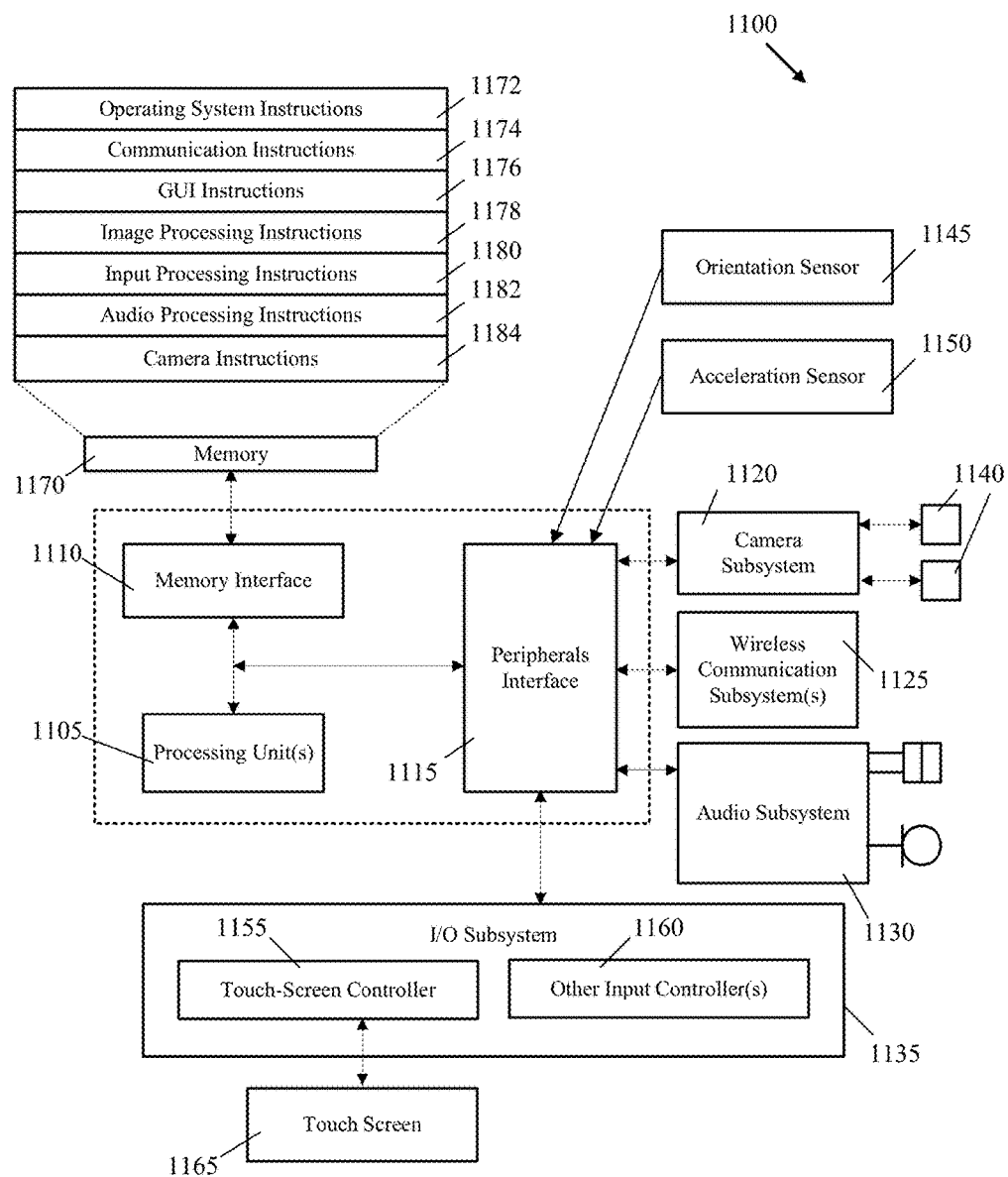
FIG. 11 is an example of an architecture of a mobile computing device.

The image organizing, editing, and viewing applications of some embodiments operate on mobile devices, such as smartphones (e.g., iPhones®) and tablets (e.g., iPads®). FIG. 11 is an example of an architecture 1100 of such a mobile computing device. Examples of mobile computing devices include smartphones, tablets, laptops, etc. As shown, the mobile computing device 1100 includes one or more processing units 1105, a memory interface 1110 and a peripherals interface 1115.

The peripherals interface 1115 is coupled to various sensors and subsystems, including a camera subsystem 1120, a wireless communication subsystem(s) 1125, an audio subsystem 1130, an I/O subsystem 1135, etc. The peripherals interface 1115 enables communication between the processing units 1105 and various peripherals. For example, an orientation sensor 1145 (e.g., a gyroscope) and an acceleration sensor 1150 (e.g., an accelerometer) is coupled to the peripherals interface 1115 to facilitate orientation and acceleration functions.

The camera subsystem 1120 is coupled to one or more optical sensors 1140 (e.g., a charged coupled device (CCD) optical sensor, a complementary metal-oxide-semiconductor (CMOS) optical sensor, etc.). The camera subsystem 1120 coupled with the optical sensors 1140 facilitates camera functions, such as image and/or video data capturing. The wireless communication subsystem 1125 serves to facilitate communication functions. In some embodiments, the wireless communication subsystem 1125 includes radio frequency receivers and transmitters, and optical receivers and transmitters (not shown in FIG. 11). These receivers and transmitters of some embodiments are implemented to operate over one or more communication networks such as a GSM network, a Wi-Fi network, a Bluetooth network, etc. The audio subsystem 1130 is coupled to a speaker to output audio (e.g., to output voice navigation instructions). Additionally, the audio subsystem 1130 is coupled to a microphone to facilitate voice-enabled functions, such as voice recognition (e.g., for searching), digital recording, etc.

The I/O subsystem 1135 involves the transfer between input/output peripheral devices, such as a display, a touch screen, etc., and the data bus of the processing units 1105 through the peripherals interface 1115. The I/O subsystem 1135 includes a touch-screen controller 1155 and other input controllers 1160 to facilitate the transfer between input/output peripheral devices and the data bus of the processing units 1105. As shown, the touch-screen controller 1155 is coupled to a touch screen 1165. The touch-screen controller 1155 detects contact and movement on the touch screen 1165 using any of multiple touch sensitivity technologies. The other input controllers 1160 are coupled to other input/control devices, such as one or more buttons. Some embodiments include a near-touch-sensitive screen and a corresponding controller that can detect near-touch interactions instead of or in addition to touch interactions.

The memory interface 1110 is coupled to memory 1170. In some embodiments, the memory 1170 includes volatile memory (e.g., high-speed random access memory), non-volatile memory (e.g., flash memory), a combination of volatile and non-volatile memory, and/or any other type of memory. As illustrated in FIG. 11, the memory 1170 stores an operating system (OS) 1172. The OS 1172 includes instructions for handling basic system services and for performing hardware dependent tasks.

The memory 1170 also includes communication instructions 1174 to facilitate communicating with one or more additional devices; graphical user interface instructions 1176 to facilitate graphic user interface processing; image processing instructions 1178 to facilitate image-related processing and functions; input processing instructions 1180 to facilitate input-related (e.g., touch input) processes and functions; audio processing instructions 1182 to facilitate audio-related processes and functions; and camera instructions 1184 to facilitate camera-related processes and functions. The instructions described above are merely exemplary and the memory 1170 includes additional and/or other instructions in some embodiments. For instance, the memory for a smartphone may include phone instructions to facilitate phone-related processes and functions. Additionally, the memory may include instructions for an image organizing, editing, and viewing application. The above-identified instructions need not be implemented as separate software programs or modules. Various functions of the mobile computing device can be implemented in hardware and/or in software, including in one or more signal processing and/or application specific integrated circuits.

While the components illustrated in FIG. 11 are shown as separate components, one of ordinary skill in the art will recognize that two or more components may be integrated into one or more integrated circuits. In addition, two or more components may be coupled together by one or more communication buses or signal lines. Also, while many of the functions have been described as being performed by one component, one of ordinary skill in the art will realize that the functions described with respect to FIG. 11 may be split into two or more integrated circuits.

VII. Computer System

Figure 12:
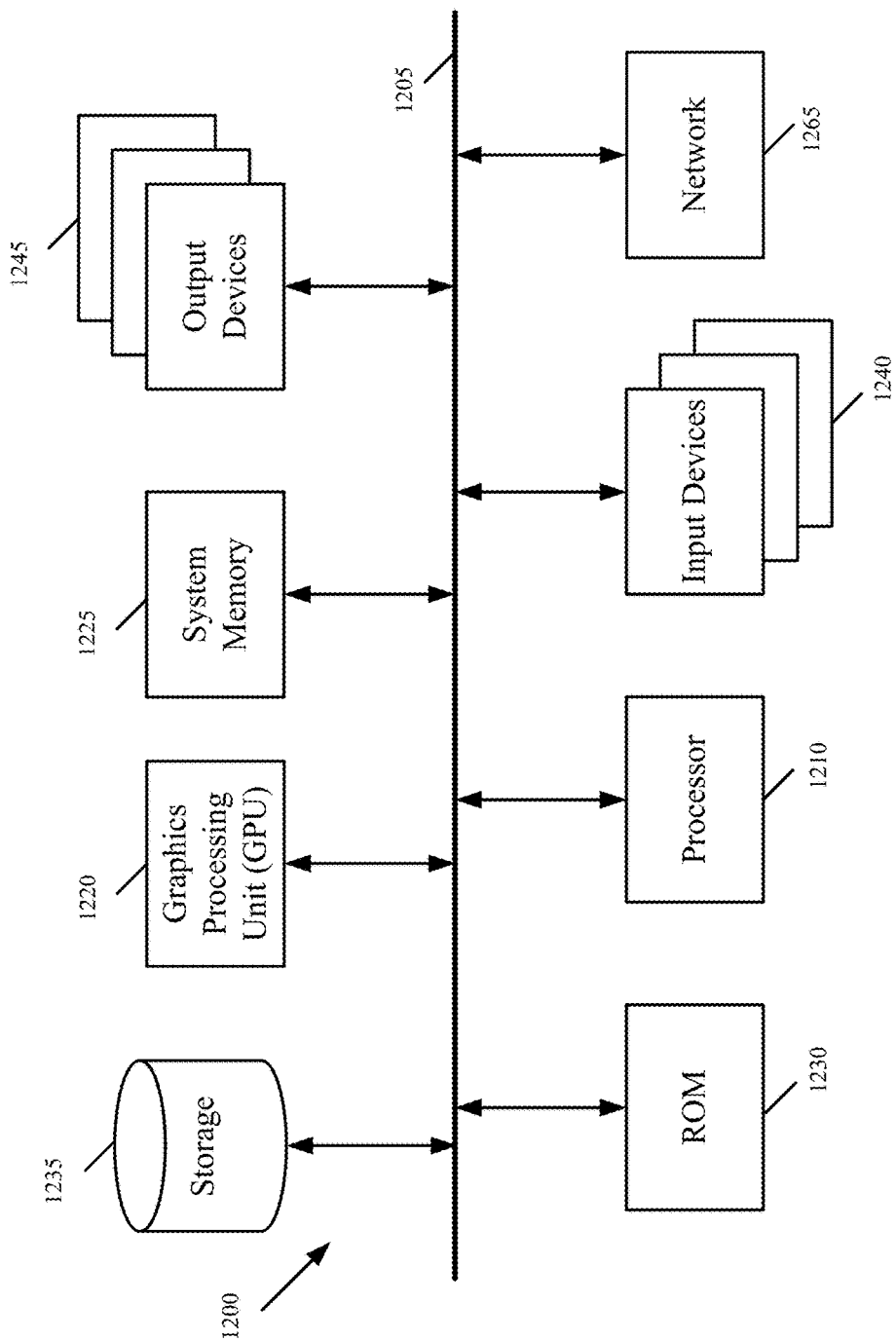
FIG. 12 conceptually illustrates another example of an electronic system with which some embodiments of the invention are implemented.

FIG. 12 conceptually illustrates another example of an electronic system 1200 with which some embodiments of the invention are implemented. The electronic system 1200 may be a computer (e.g., a desktop computer, personal computer, tablet computer, etc.), phone, PDA, or any other sort of electronic or computing device. Such an electronic system includes various types of computer readable media and interfaces for various other types of computer readable media. Electronic system 1200 includes a bus 1205, processing unit(s) 1210, a graphics processing unit (GPU) 1215, a system memory 1220, a network 1225, a read-only memory 1230, a permanent storage device 1235, input devices 1240, and output devices 1245.

The bus 1205 collectively represents all system, peripheral, and chipset buses that communicatively connect the numerous internal devices of the electronic system 1200. For instance, the bus 1205 communicatively connects the processing unit(s) 1210 with the read-only memory 1230, the GPU 1215, the system memory 1220, and the permanent storage device 1235.

From these various memory units, the processing unit(s) 1210 retrieves instructions to execute and data to process in order to execute the processes of the invention. The processing unit(s) may be a single processor or a multi-core processor in different embodiments. Some instructions are passed to and executed by the GPU 1215. The GPU 1215 can offload various computations or complement the image processing provided by the processing unit(s) 1210.

The read-only-memory (ROM) 1230 stores static data and instructions that are needed by the processing unit(s) 1210 and other modules of the electronic system. The permanent storage device 1235, on the other hand, is a read-and-write memory device. This device is a non-volatile memory unit that stores instructions and data even when the electronic system 1200 is off. Some embodiments of the invention use a mass-storage device (such as a magnetic or optical disk and its corresponding disk drive) as the permanent storage device 1235.

Other embodiments use a removable storage device (such as a floppy disk, flash memory device, etc., and its corresponding drive) as the permanent storage device. Like the permanent storage device 1235, the system memory 1220 is a read-and-write memory device. However, unlike storage device 1235, the system memory 1220 is a volatile read-and-write memory, such a random access memory. The system memory 1220 stores some of the instructions and data that the processor needs at runtime. In some embodiments, the invention's processes are stored in the system memory 1220, the permanent storage device 1235, and/or the read-only memory 1230. For example, the various memory units include instructions for processing multimedia clips in accordance with some embodiments. From these various memory units, the processing unit(s) 1210 retrieves instructions to execute and data to process in order to execute the processes of some embodiments.

The bus 1205 also connects to the input and output devices 1240 and 1245. The input devices 1240 enable the user to communicate information and select commands to the electronic system. The input devices 1240 include alphanumeric keyboards and pointing devices (also called "cursor control devices"), cameras (e.g., webcams), microphones or similar devices for receiving voice commands, etc. The output devices 1245 display images generated by the electronic system or otherwise output data. The output devices 1245 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 12, bus 1205 also couples electronic system 1200 to a network 1225 through a network adapter (not shown). In this manner, the computer can be a part of a network of computers (such as a local area network ("LAN"), a wide area network ("WAN"), or an Intranet, or a network of networks, such as the Internet. Any or all components of electronic system 1200 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

VIII. Media Item Purchasing Network

Figure 13:
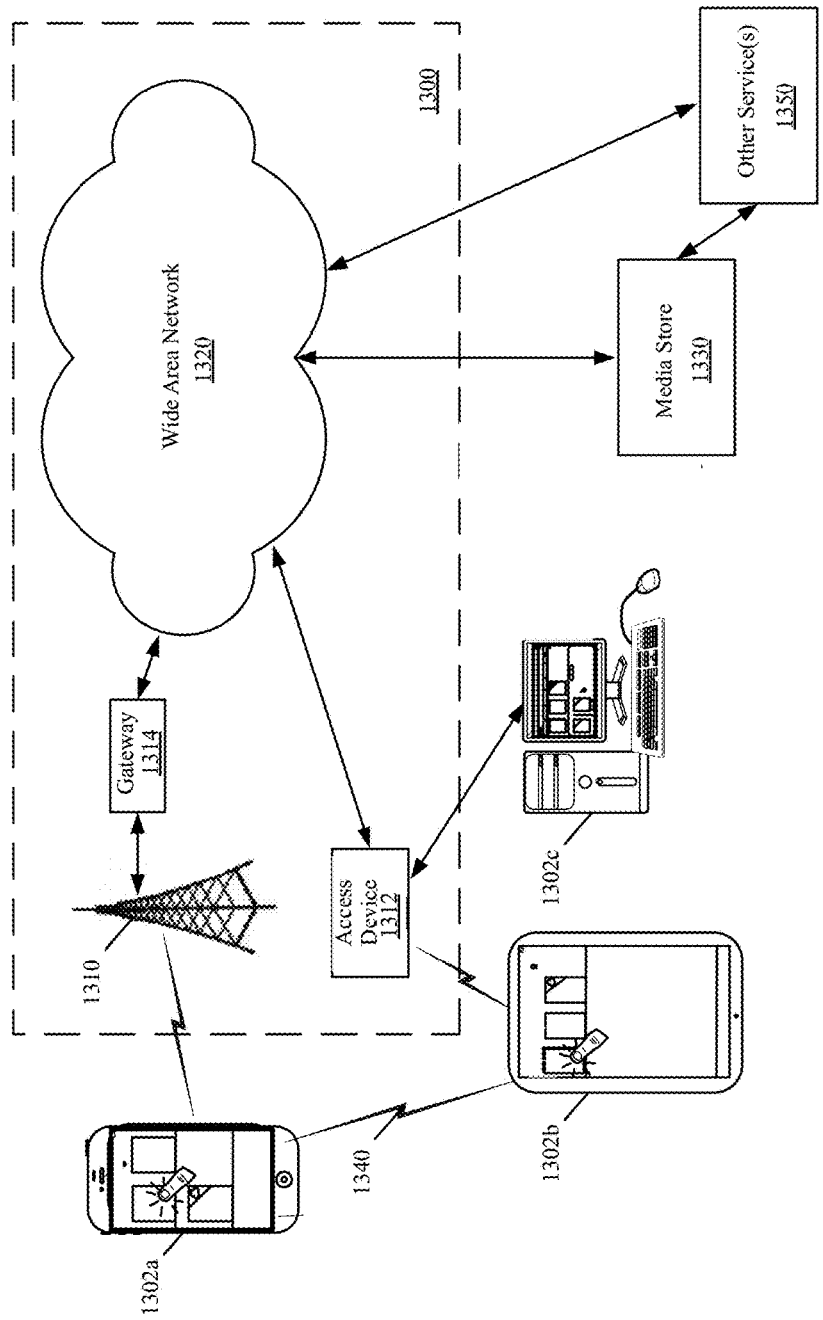
FIG. 13 illustrates one possible embodiment of an operating environment for a media item purchasing service and client devices.

FIG. 13 illustrates one possible embodiment of an operating environment 1300 for a media item purchasing service 1330 and client devices 1302*a*-1302*c*. In some embodiments, devices 1302*a*, 1302*b*, and 1302*c* communicate over one or more wire or wireless networks 1310. For example, wireless network 1310, such as a cellular network, can communicate with a wide area network (WAN) 1320, such as the Internet, by use of gateway 1314. A gateway 1314 in some embodiments provides a packet oriented mobile data service, such as General Packet Radio Service (GPRS), or other mobile data service allowing wireless networks to transmit data to other networks, such as wide area network 1320. Likewise, access device 1312 (e.g., IEEE 802.11g wireless access device) provides communication access to WAN 1320. Devices 1302*a* and 1302*b* can be any portable electronic or computing device capable of communicating with a media item purchasing service 1330 (e.g., laptops, tablets, or smartphones). Device 1302*c* can be any non-portable electronic or computing device capable of communicating with a media item purchasing service (e.g., a desktop computer).

In some embodiments, both voice and data communications are established over wireless network 1310 and access device 1312. For instance, device 1302*a* can place and receive phone calls (e.g., using voice over Internet Protocol (VoIP) protocols), send and receive e-mail messages (e.g., using Simple Mail Transfer Protocol (SMTP) or Post Office Protocol 3 (POP3)), and retrieve electronic documents and/or streams, such as web pages, photographs, and videos, over wireless network 1310, gateway 1314, and WAN 1320 (e.g., using Transmission Control Protocol/Internet Protocol (TCP/IP) or User Datagram Protocol (UDP)). Likewise, in some implementations, devices 1302*b* and 1302*c* can place and receive phone calls, send and receive e-mail messages, and retrieve electronic documents over access device 1312 and WAN 1320. In various embodiments, any of the illustrated client devices may communicate with media item purchasing service 1330 and/or other service(s) 1350 using a persistent connection established in accordance with one or more security protocols, such as the Secure Sockets Layer (SSL) protocol or the Transport Layer Security (TLS) protocol.

Devices 1302*a* and 1302*b* can also establish communications by other means. For example, wireless device 1302*a* can communicate with other wireless devices (e.g., other devices 1302*b*, cell phones, etc.) over the wireless network 1310. Likewise devices 1302*a* and 1302*b* can establish peer-to-peer communications 1340 (e.g., a personal area network) by use of one or more communication subsystems, such as Bluetooth® communication from Bluetooth Special Interest Group, Inc. of Kirkland, Wash. Device 1302*c* can also establish peer to peer communications with devices 1302*a* or 1302*b* (not shown). Other communication protocols and topologies can also be implemented.

Devices 1302*a*, 1302*b*, and 1302*c* can communicate with media item purchasing service 1330 over one or more wired and/or wireless networks, 1312 or 1310. For instance, media item purchasing service 1330 can provide media item data (e.g., details about media items, or data containing the media items) to rendering devices 1302*a*, 1302*b*, and 1302*c*. Media item purchasing service 1330 may also communicate with other services 1350 to obtain data to implement media item purchasing services. For example the media item purchasing service 1330 may receive copies of media items from a service that allows authors to upload books to the media item purchasing service 1330.

In various embodiments, media item purchasing service 1330 and/or other service(s) 1350 are configured to process search requests from any of the client devices. Search requests may include but are not limited to queries for book titles, video titles, audio file titles (e.g., song titles or album titles), other information about media items, or some combination thereof. Media item purchasing service 1330 and/or other service(s) 1350 may be configured to return results related to a variety of parameters including but not limited to purchasing prices, descriptions of media items, ratings of media items, etc. In various embodiments, these parameters may affect the composition of the search results (and/or the ordering of the search results) based on different priority weightings. In various embodiments, the search results that are returned may be a subset of results selected based on specific criteria including but not limited to a quantity of times the search result (e.g., a particular point of interest) has been requested, a measure of quality associated with the search result (e.g., highest user or editorial review rating of a media item), and/or the volume of reviews for the search results (e.g., the number of times the search result has been review or rated).

In various embodiments, media item purchasing service 1330 and/or other service(s) 1350 are configured to provide auto-complete search results that are displayed on the client device, such as within a media store. For instance, auto-complete search results may populate a portion of the screen as the user enters one or more search keywords on the multifunction device. In some cases, this feature may save the user time as the desired search result may be displayed before the user enters the full search query. In various embodiments, the auto complete search results may be search results found by the client on the client device (e.g., bookmarks or contacts), search results found elsewhere (e.g., from the Internet) by media item purchasing service 1330 and/or other service(s) 1350, and/or some combination thereof.

As is the case with commands, any of the search queries may be entered by the user via voice or through typing. The multifunction device may be configured to display search results in any of the various graphical user interfaces (GUIs) described herein, or in other GUIs with similar operations. For instance, a media item may be displaying in a store or in a library as part of a series object display. In various embodiments, responsive to a user selection of one of these points of interest (e.g., a touch selection, such as a tap), the multifunction device is configured to display additional information about the selected media item including but not limited to ratings, reviews or review snippets, samples of the media item, and/or images associated with the media item (e.g., cover art). In various embodiments, any of this information may be displayed on a graphical information card that is displayed in response to the user's selection of the point of interest.

In various embodiments, media item purchasing service 1330 and/or other service(s) 1350 provide one or more feedback mechanisms to receive feedback from client devices 1302a-1302c. For instance, client devices may provide feedback on search results to media item purchasing service 1330 and/or other service(s) 1350 (e.g., feedback specifying ratings, reviews, etc.); this feedback may be used to update information about media items in order to provide better search results in the future.

While the invention has been described with reference to numerous specific details, one of ordinary skill in the art will recognize that the invention can be embodied in other specific forms without departing from the spirit of the invention. For instance, many of the figures illustrate various touch gestures (e.g., taps, double taps, swipe gestures, press and hold gestures, etc.). However, many of the illustrated operations could be performed via different touch gestures (e.g., a swipe instead of a tap, etc.) or by non-touch input (e.g., using a cursor controller, a keyboard, a touchpad/trackpad, a near-touch-sensitive screen, etc.). In addition, a number of the figures conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

What is claimed is:

1. A non-transitory machine readable medium storing a program which when executed by at least one processing unit provides e-books, in an e-book organizing application, the program comprising sets of instructions for:
   determining that a user has read a threshold amount of a first purchased e-book in the series, the threshold amount comprising reaching a particular number of pages or a particular percentage of pages of the first purchased e-book;
   in response to the determination that the user has read the threshold amount of the first purchased e-book in the series, replacing a book GUI item representing the first purchased e-book with a series GUI item representing the series in a library display area;
   receiving a selection of the series GUI item;
   in response to the selection, concurrently displaying a series display area of e-books with the library display area, wherein the series display area displays a respective book GUI item for each e-book in the series of e-books.

2. The non-transitory machine readable medium of claim 1, wherein the program further comprises sets of instructions for:
   receiving a selection to display all e-books in a series:
   in response to the selection to display all e-books in the series, in a series display area:
      displaying representations of unpurchased e-books in the series accompanied by a purchasing control: and displaying representations of purchased e-books in the series unaccompanied by a purchasing control.

3. The non-transitory machine readable medium of claim 2, wherein the program further comprises sets of instructions for:
   receiving a selection to display purchased e-books in the series:
      in response to the selection to display purchased e-books in the series:
         displaying a representation of the first e-book and the representation of the second e-book in the series display area; and displaying a purchasing control for receiving a command from the user to purchase the second e-book.

4. The non-transitory machine readable medium of claim 3, wherein the program further comprises sets of instructions for, upon receiving the selection to display purchased e-books, ceasing to display the representations of unpurchased e-books in the series other than the second e-book.

5. The non-transitory machine readable medium of claim 1 wherein the program further comprises sets of instructions for:
   displaying, in a library display area for displaying representations of e-books in a library of e-books, representations of multiple e-books;
   when the library (i) includes the first e-book of the series and no other e-books of the series and (ii) less than the threshold amount of the first e-book has been read, displaying the representation of the first e-book in the library display area; and
   when the library (i) includes the first e-book of the series and no other e-books of the series and (ii) at least the threshold amount of the first e-book has been read, displaying the series GUI item representing the series in the library display area.

6. The non-transitory machine readable medium of claim 5 wherein the program further comprises a set of instructions for, when the library includes both the first e-book of the series and at least a second e-book of the series, displaying the representation of the particular series in a library mode.

7. The non-transitory machine readable medium of claim 5, wherein the program further comprises a set of instructions for displaying a representation of the first e-book and the representation of the second e-book in the series display area when the library (i) includes the first e-book of the series and no other e-books of the series and (ii) at least the threshold amount of the first e-book has been read.

8. The non-transitory machine readable medium of claim 1, wherein the program further comprises sets of commands for:

receiving a selection from the user to purchase an unpurchased e-book; and providing the unpurchased e-book in response to the received selection.

9. The non-transitory machine readable medium of claim 8, wherein providing the unpurchased e-book comprises downloading the unpurchased e-book.

10. A non-transitory machine readable medium storing a program which when executed by at least one processing unit provides media items, in a media item organizing application, the program comprising sets of instructions for:

determining that when more than a threshold amount of a first media item of a series has been consumed, a series GUI item representing the series is displayed in a library display area in response to the determination that more than the threshold amount of the first media item has been consumed, wherein the threshold amount comprises a greater of:

a particular number of pages or a particular percentage of pages of the first purchased media item and a certain page of a range of pages of the first purchased media item;

and replacing a representation of the first media item representing a first purchased e-book with the series GUI item in the series display area;

receiving a selection of the series GUI item;

in response to the selection, concurrently displaying a series display area of e-books with the library display area, wherein the display area displays a respective book GUI item for each e-book in the series of e-books.

11. The non-transitory machine-readable medium of claim 10, wherein the set of instructions for determining that the threshold amount of the first media item has been consumed comprises a set of instructions for determining that a media item layer has displayed a threshold percentage of the first media item.

12. The non-transitory machine readable medium of claim 10, wherein the set of instructions for determining that the threshold amount of the first media item has been consumed comprises a set of instructions for determining that a media item player has displayed at least part of at the first media item beyond a threshold part of the media item.

13. The non-transitory machine readable medium of claim 10, wherein the program further comprises a set of instructions for displaying a purchasing control when receiving a selection from the user to purchase the series GUI item.

14. The non-transitory machine readable medium of claim 13, wherein the program further comprises a set of instructions for receiving a selection to display representations of all media series GUI items in the series.

15. The non-transitory machine readable medium of claim 14, wherein the program further comprises sets of instructions for:

displaying representations of unpurchased series GUI items in the series accompanied by a purchasing control; and displaying representations of purchased series GUI items in the series unaccompanied by a purchasing control.

16. The non-transitory machine readable medium of claim 10, wherein the program further comprises sets of instructions for:

displaying, in the library display area, representations of multiple media items in the library of media items;

when the library (i) includes the first media item of the series and no other media items of the series and (ii) less than the threshold amount of the first media item has been consumed, displaying the representation of the first media item in the library display area; and when the library (i) includes the first media item of the series and no other media items of the series and (ii) at least the threshold amount of the first media item has been consumed, displaying the series GUI item in the library display area.

17. The non-transitory machine readable medium of claim 16, wherein the program further comprises a set of instructions for, when the library includes both the first media item of the series and at least one of the series GUI item representing series of e-books, displaying the series GUI item in the library display area.

18. The non-transitory machine readable medium of claim 16, wherein the series GUI item indicates the highest numbered media item, in the series, included in the library.

19. The non-transitory machine readable medium of claim 10, wherein providing the series GUI item comprises downloading the series GUI item and displaying a representation of the series GUI item without a purchasing control.

20. A method of providing e-books, in an e-book organizing application, the method comprising:

determining that a threshold amount of a first e-book of a series has been read, wherein the threshold amount comprises a greater of:

a particular number of pages or a particular percentage of pages of the first purchased e-book and a certain page of a range of pages of the first purchased e-book, in response to the determination, replacing a representation of the first purchased e-book with a series GUI item representing a second e-book in the series, wherein the second e-book is purchasable by a user;

receiving a selection of the series GUI item;

in response to the selection, concurrently displaying a series display area of e-books with the library display area, wherein the display area displays a respective book GUI item for each e-book in the series of e-books;

receiving a selection from the user to purchase the second e-book; and providing the second e-book in response to the received selection, where the second e-book is purchasable without refreshing the e-book organizing application.

21. The method of claim 20, wherein determining that the threshold amount of the first e-book has been read comprises determining that an e-book reader has displayed a threshold percentage of pages of the first e-book.

22. The method of claim 20 further comprising:

displaying a purchasing control for said receiving the selection from the user to purchase the second e-book without leaving the series display area.

23. The method of claim 22 further comprising:

receiving a selection to display representations of all e-books in the series; and displaying representations of all e-books in the series.

24. The method of claim 23, wherein displaying representations of all e-books in the series comprises:

displaying representations of unpurchased e-books in the series accompanied by a purchasing control; and displaying representations of purchased e-books in the series unaccompanied by a purchasing control.

25. The non-transitory machine readable medium of claim 1, wherein the threshold amount comprises a particular number of pages of the first e-book or a particular percentage of pages of the first e-book.

26. The non-transitory machine readable medium of claim 1, wherein the representations of unpurchased e-books in the series are based in part on a purchase history.

\* \* \* \* \*